US008072628B2

(12) United States Patent
Oosawa

(10) Patent No.: US 8,072,628 B2
(45) Date of Patent: Dec. 6, 2011

(54) PRINTING APPARATUS, NETWORK DEVICE, PRINTING CONTROL METHOD, AND PRINTING CONTROL PROGRAM CAPABLE OF TRANSMITTING PRINT IMAGE DATA TO PRINTING HARDWARE PRIOR TO REGISTRATION OF PRINT JOB

(75) Inventor: Takaharu Oosawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 11/191,813

(22) Filed: Jul. 28, 2005

(65) Prior Publication Data

US 2006/0044600 A1 Mar. 2, 2006

(30) Foreign Application Priority Data

Aug. 27, 2004 (JP) ................................ 2004-249018

(51) Int. Cl.
*G06K 15/00* (2006.01)

(52) U.S. Cl. ..................... 358/1.15; 358/1.13; 358/1.14; 358/1.16

(58) Field of Classification Search ................. 358/1.15, 358/1.13, 1.14, 1.16
See application file for complete search history.

(56) References Cited

U.S. PATENT DOCUMENTS 5,287,194 A * 2/1994 Lobiondo ..................... 358/296
5,327,526 A * 7/1994 Nomura et al. .............. 358/1.16
5,715,379 A * 2/1998 Pavlovic et al. ............. 358/1.13
5,754,747 A * 5/1998 Reilly et al. ................. 358/1.15
5,898,823 A * 4/1999 Sorkin et al. ................. 358/1.15
6,115,132 A * 9/2000 Nakatsuma et al. .......... 358/1.14
6,552,813 B2 * 4/2003 Yacoub .......................... 358/1.1
6,606,163 B1 * 8/2003 Suzuki et al. ................ 358/1.15
6,771,386 B1 * 8/2004 Kato ............................. 358/1.15
6,863,455 B2 * 3/2005 Blom et al. ..................... 400/61
(Continued)

FOREIGN PATENT DOCUMENTS

JP 02-146618 A 6/1990
(Continued)

OTHER PUBLICATIONS

The above foreign patent documents were cited in a Feb. 23, 2010 Japanese Office Action, which is enclosed without an English Translation, that issued in Japanese Patent Application No. 2004-249018.

*Primary Examiner* — Twyler Haskins
*Assistant Examiner* — Dennis Dicker
(74) *Attorney, Agent, or Firm* — Cowan, Liebowitz & Latman, P.C.

(57) ABSTRACT

Disclosed is a printing apparatus capable of quickly performing the first printing while managing print requests. More specifically, a print request is received from an external device (S1301), and the received print request is registered in a register (S1304, S1308). Upon reception of the print request, the presence/absence of a print request which is registered in the register is determined (S1302). Print data is requested of the external device (S1306, S1307). The process order of print requests registered in the register is controlled (S1305). If it is determined in a determining step (S1302) that no print request is registered in the register, a print data request step (S1307) is performed before a registration step (S1308). If it is determined in the determining step (S1302) that a print request is registered in the register, the print data request step (S1306) is performed after the registration step (S1304).

10 Claims, 21 Drawing Sheets

U.S. PATENT DOCUMENTS

| | | | | |
|---|---|---|---|---|
| 6,874,034 | B1 * | 3/2005 | Hertling | 709/245 |
| 7,170,617 | B1 * | 1/2007 | Harrison et al. | 358/1.15 |
| 7,254,355 | B2 * | 8/2007 | Sahay | 399/82 |
| 7,583,400 | B2 * | 9/2009 | Yagita | 358/1.15 |
| 7,646,506 | B2 * | 1/2010 | Harrison et al. | 358/1.15 |
| 2006/0238797 | A1 * | 10/2006 | Berglin | 358/1.15 |

FOREIGN PATENT DOCUMENTS

| | | | |
|---|---|---|---|
| JP | 05-313839 | A | 11/1993 |
| JP | 10-293661 | A | 11/1998 |
| JP | 11-134139 | | 5/1999 |
| JP | 2000-333026 | A | 11/2000 |

* cited by examiner

FIG. 10

| CLIENT MANAGEMENT QUEUE 1001 | CLIENT INFORMATION 1002 |
|---|---|
| CLIENT ID=1 | CLIENT ID |
| CLIENT ID=2 | CLIENT IP ADDRESS |
| CLIENT ID=3 | REGISTRATION EVENT |
| CLIENT ID=4 | |
| | |
| ⋮ | ⋮ |
| | |
| | |
| | |
| | |

PRINTING APPARATUS, NETWORK DEVICE, PRINTING CONTROL METHOD, AND PRINTING CONTROL PROGRAM CAPABLE OF TRANSMITTING PRINT IMAGE DATA TO PRINTING HARDWARE PRIOR TO REGISTRATION OF PRINT JOB

FIELD OF THE INVENTION

The present invention relates to a network print server and printer control system which are mounted in a printer apparatus and, more particularly, to the printing control system.

BACKGROUND OF THE INVENTION

Recently, there is proposed a printing control system having a function of managing a network printer while a computer and printing control application cooperate with each other, a function of monitoring the use state of a network, and a function of scheduling print data.

The printing control system controls the order of print requests from a computer, tracks jobs from the start of a print request to the end of printing, and notifies the user of a print status in detail (Japanese Patent Laid-Open No. 11-134139).

This control system can control printing by job scheduling, but takes a long time for the first printing (printing on the first sheet while the device is idle) owing to an additional process associated with job scheduling. More specifically, a scheduling process including registration of a requested job, monitoring of the device status, and a printing start instruction is time-consuming. The process time becomes longer than that when no scheduling is performed.

Japanese Patent Laid-Open No. 11-134139 discloses a printer which assigns priority to print data and prints data of high priority without any standby time. However, the disclosed technique does not solve an increase in first print time.

SUMMARY OF THE INVENTION

The present invention enables to provide a printing apparatus capable of quickly printing print data on the first sheet while managing jobs.

According to one aspect of the present invention, the foregoing problem is solved by proving a printing apparatus characterized by comprising a receiver for receiving a print request from an external device, a register for registering the print request received by the receiver, and controller for controlling a process order of the print request registered in the register, wherein the controller requests the external device to transmit print data before the print request received by the receiver is registered in the register when no print request is registered in the register.

According to another aspect of the present invention, the foregoing problem is solved by providing a network device dismountable from a printing apparatus, characterized by comprising a receiver for receiving a print request from an external device, a register for registering the print request received by the receiver, and a controller for controlling a process order of the print request registered in the register, wherein the controller requests the external device to transmit print data before the print request received by the receiver is registered in the register when no print request is registered in the register.

According to another aspect of the present invention, the foregoing problem is solved by providing a printing control method characterized by comprising a receiving step of receiving a print request from an external device, a registration step of registering, in a queue, the print request received in the receiving step, a determining step of, when the print request is received in the receiving step, determining presence/absence of a print request which is registered in the queue, and a print data request step of requesting the external device to transmit print data, wherein when it is determined that no print request have been registered in the queue, the print data request step is performed before the registration step, and when it is determined that at least one print request have been registered in the queue, the print data request step is performed after the registration step.

According to another aspect of the present invention, the foregoing problem is solved by providing a printing control program for controlling printing by causing a processor in a printing apparatus to execute a receiving step of receiving a print request from an external device, a registration step of registering, in queue, the print request received in the receiving step, a determining step of, when the print request is received in the receiving step, determining presence/absence of a print request which is registered in the queue, and a print data request step of requesting the external device to transmit print data, characterized in that when it is determined that no print request have been registered in the queue, the print data request step is performed before the registration step, and when it is determined that at least one print request have been registered in the queue, the print data request step is performed after the registration step.

Other features and advantages of the present invention will be apparent from the following description taken in conjunction with the accompanying drawings, in which similar reference characters designate the same or similar parts throughout the figures thereof.

BRIEF DESCRIPTION OF THE DRAWINGS

FIG. 10 is a view showing client information and a client management queue which are managed by a device scheduler 900;

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Configuration>

Figure 1:
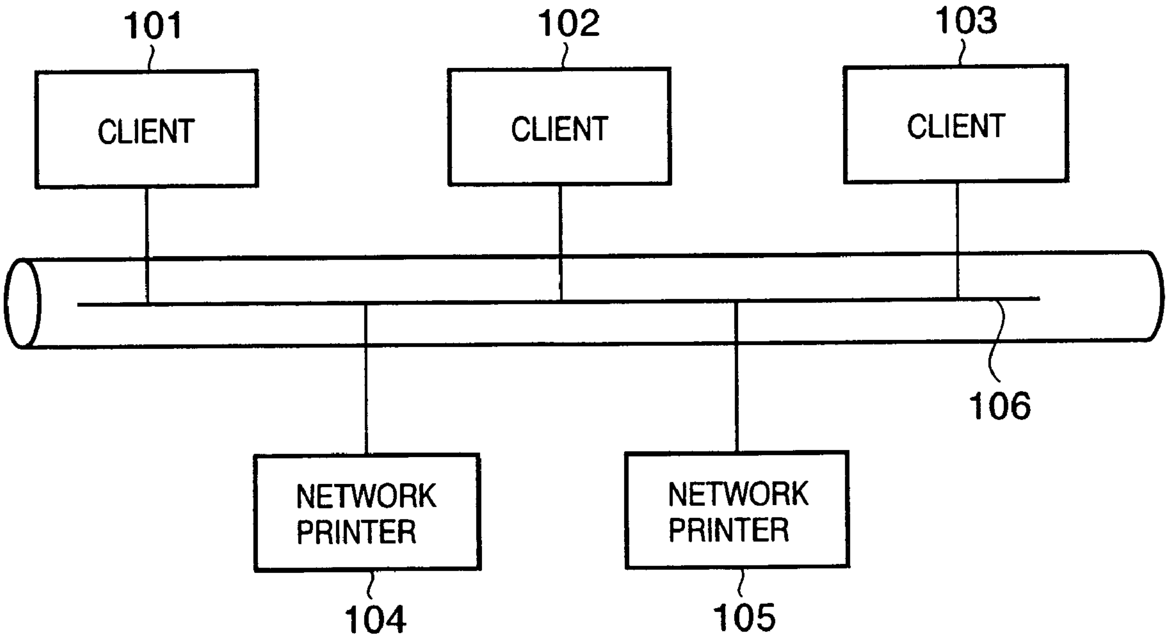
FIG. 1 is a block diagram showing the overall configuration of a printing system according to the first embodiment of the present invention.

FIG. 1 is a block diagram showing the overall configuration of a printing system according to the first embodiment of the present invention. The printing system comprises client computers 101 to 103 serving as information processing apparatuses, and network printers 104 and 105 serving as printing apparatuses. These apparatuses are connected to each other to constitute a printing system as a whole.

The client computers 101 to 103 store a printing control program in an executable form, and has a function of managing the network printers 104 and 105 included in the printing system and a function of storing a file used in a network and monitoring the use state of the network. More specifically, each of the client computers 101 to 103 has a function of creating a print job by itself and issuing a schedule request to the scheduler of the network printer 104 or 105, and a function of starting transfer of print data in accordance with an instruction from the scheduler of the network printer 104 or 105.

The network printers 104 and 105 are printing devices serving as physical apparatuses which receive print jobs containing print data from the client computers 101 to 103, analyze the received print jobs, and print. As the network printers 104 and 105, the printing system can employ various types of printing apparatuses such as a laser beam printer complying with electrophotography, an inkjet printer complying with an inkjet method, and a printer complying with thermal transfer.

The network printers 104 and 105 have a function of accepting print requests from the client computers 101 to 103, determining the order of the accepted print requests, and issuing a print instruction, and a function of monitoring print jobs transferred to the network printers 104 and 105 and the statuses of the network printers 104 and 105, and notifying the client computers 101 to 103 of the end of printing and printer statuses.

Communication between apparatuses included in the printing system may be wired communication using an Ethernet® cable or the like, or wireless communication using radio waves or light.

<Internal Configuration of Client Computers 101 to 103>

Figure 2:
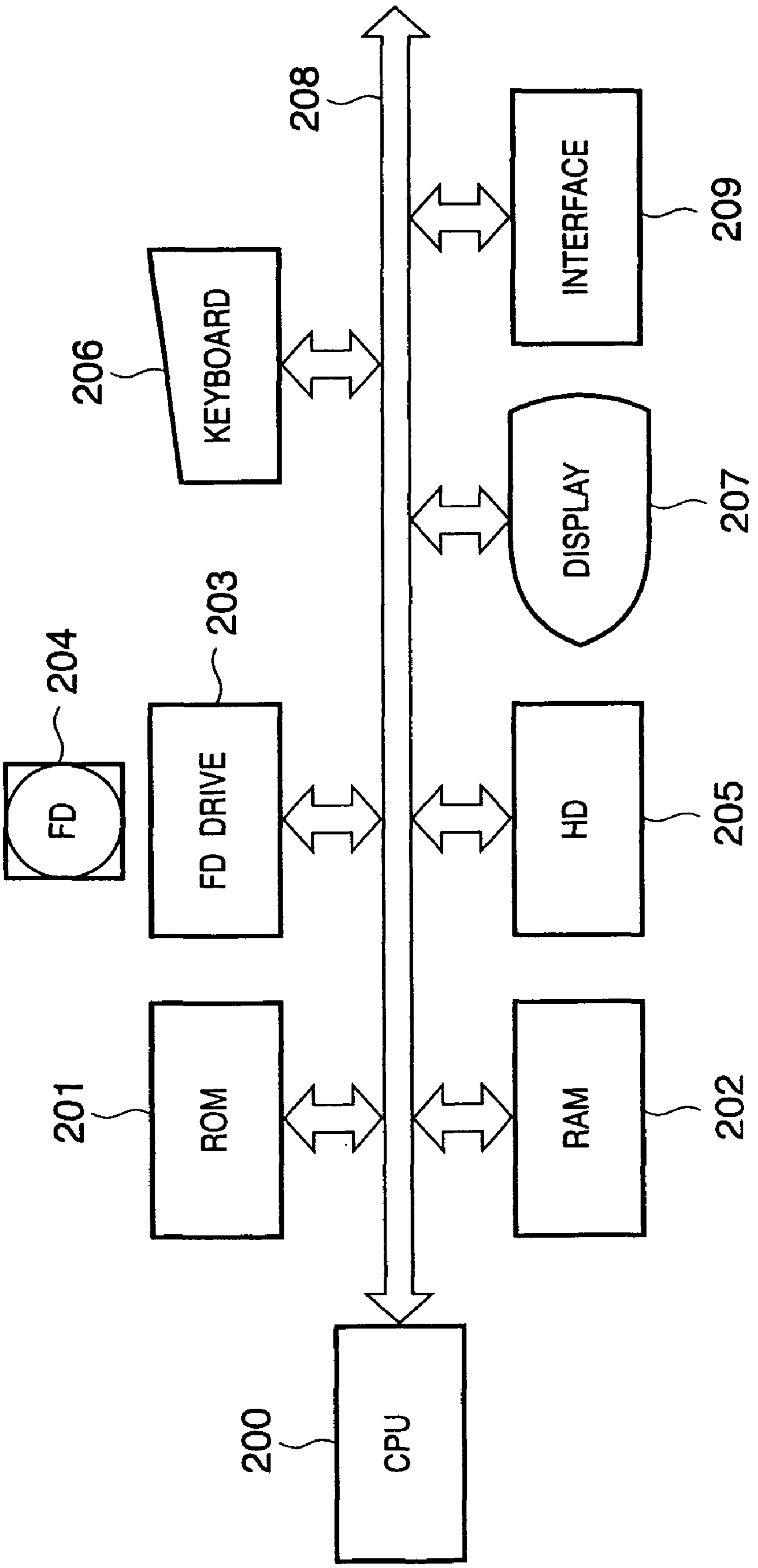
FIG. 2 is a block diagram for explaining the hardware configuration of client computers 101 to 103.

FIG. 2 is a block diagram for explaining the hardware configuration of the client computers 101 to 103 shown in FIG. 1.

In FIG. 2, a CPU 200 is a control means for controlling to read out an application program, printer driver program, operating system, printing control program, or the like which is stored in an HD (Hard Disk) 205, execute a readout program, and temporarily store, in a RAM 202, information, files, and the like necessary to execute the program.

A ROM 201 is a storage means for storing programs such as a basic I/O program, and various data such as font data and template data used for document processing. The RAM 202 is a temporary storage means functioning as a main memory, work area, or the like for the CPU 200.

Figure 5:
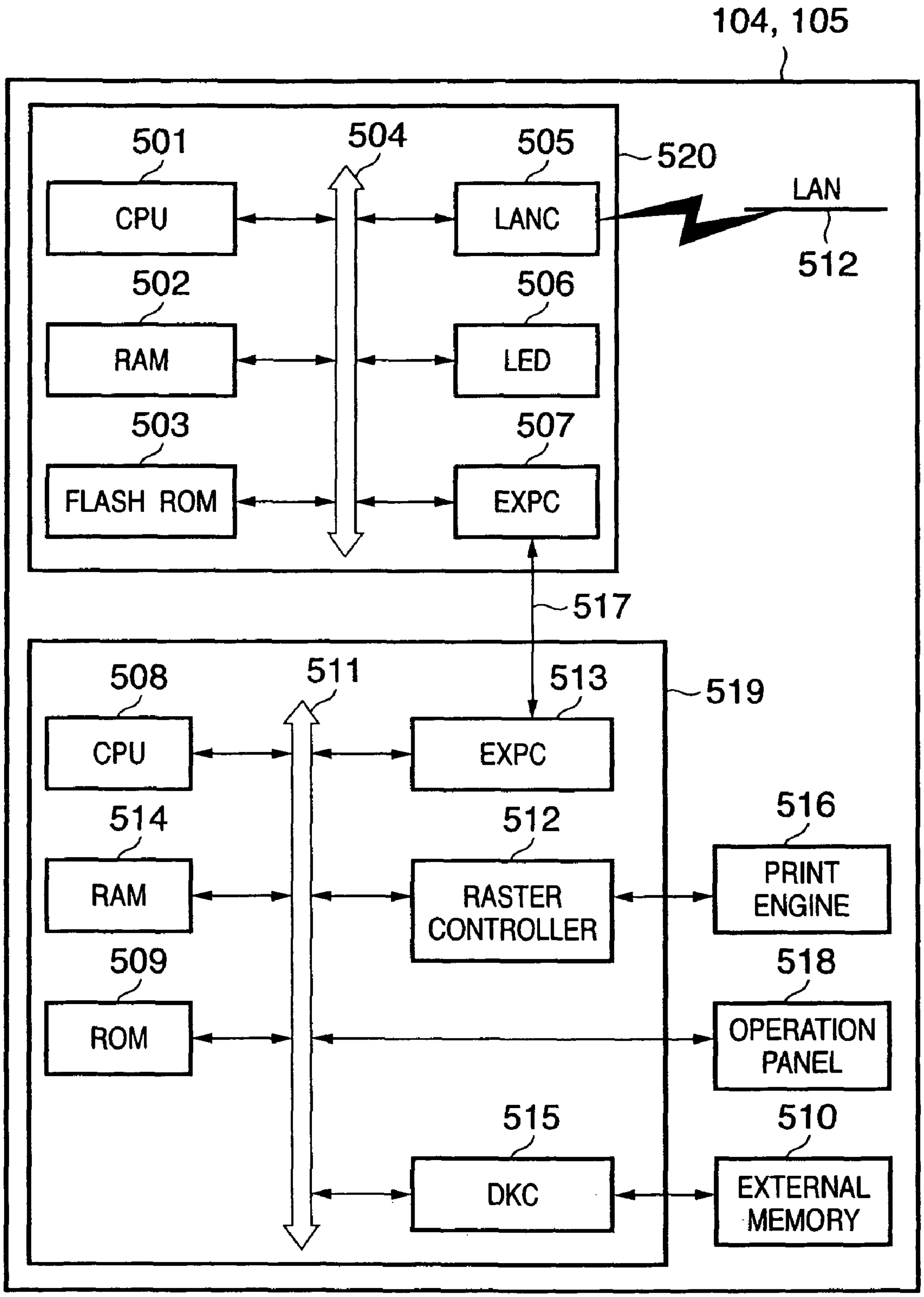
FIG. 5 is a block diagram for explaining the hardware configuration of a printer.

An FD (Floppy® Disk) drive 203 is a storage medium loading means for loading into the computer system a program stored in an FD 204 serving as a storage medium, as shown in FIG. 5 (to be described later). The client computers 101 to 103 may comprise another storage medium loading means instead of or together with the FD drive 203. Another storage medium includes all computer-readable storage media such as a CD-ROM, CD-R, CD-RW, PC card, DVD, IC memory card, MO, and memory stick.

The HD 205 is an external storage means functioning as a large-capacity memory, and stores an application program, printer driver program, operating system, printing control program, relevant program, and the like. In the client computers 101 to 103, a spooler is ensured in the HD 205. A keyboard 206 is an instruction input means for allowing the user to input a control command and the like. A display 207 is a display means for displaying a command input from the keyboard 206, the statuses of the network printers 104 and 105, and the like.

In practice, a display instruction is issued to the display means via an operating system running on the client computers 101 to 103, and a resource file display instruction is issued from the print process program to the operating system.

Reference numeral 208 denotes a system bus which controls the flow of data in the client computers 101 to 103. An interface 209 is an input/output means, and the client computers 101 to 103 exchange data with other apparatuses on the network via the interface 209.

<Description of Memory Map and the Like>

Figure 3:
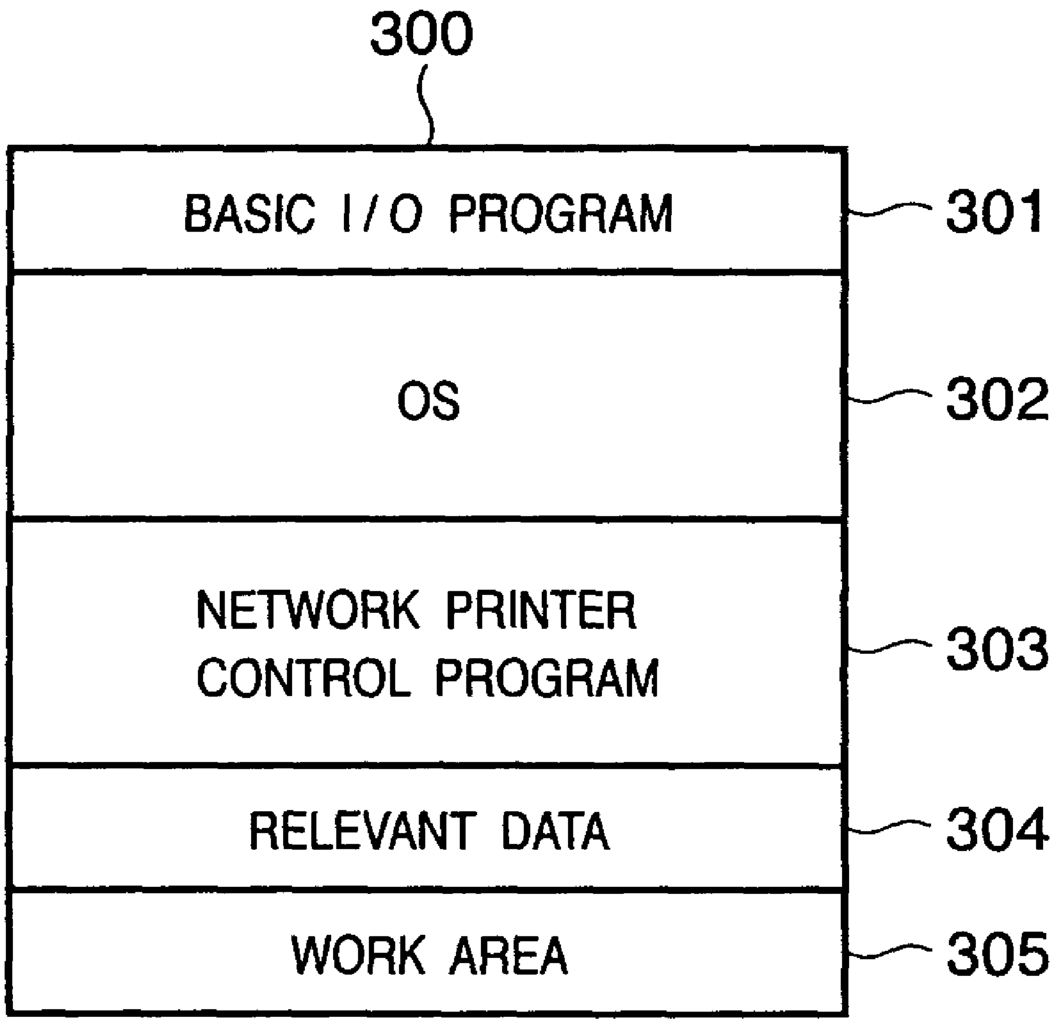
FIG. 3 is a view showing an example of the memory map of a RAM 202 shown in FIG. 2.

FIG. 3 is a view showing an example of the memory map of the RAM 202 shown in FIG. 2. This memory map corresponds to a state in which the printing control program is loaded into the RAM 202 and becomes executable.

The printing control program and relevant data may be installed in advance from the FD 204 into the HD 205 and loaded from the HD 205 into the RAM 202, or may be directly loaded from the FD 204 into the RAM 202 and executed. The printing control program can be stored in the ROM 201, assembled as part of the memory map, and directly executed by the CPU 200. The hardware apparatus can be replaced with software having the same functions as those of the above apparatuses.

In the client computers 101 to 103, the printing control program controls to issue an instruction to transfer print data, change the printing destination of a print job, or change the printing order.

Reference numeral 301 denotes an area for storing a basic I/O program. The basic I/O program has, e.g., an IPL (Initial Program Loading) function of, when the apparatus is powered on, loading an operating system from the HD 205 into the RAM 202 and starting operation of the operating system.

Reference numeral 302 denotes an area where an operating system is stored; and 303, an area where the printing control program is stored. Reference numeral 304 denotes an area where relevant data is stored. Reference numeral 305 denotes a work area used to execute various programs by the CPU 200.

Figure 4:
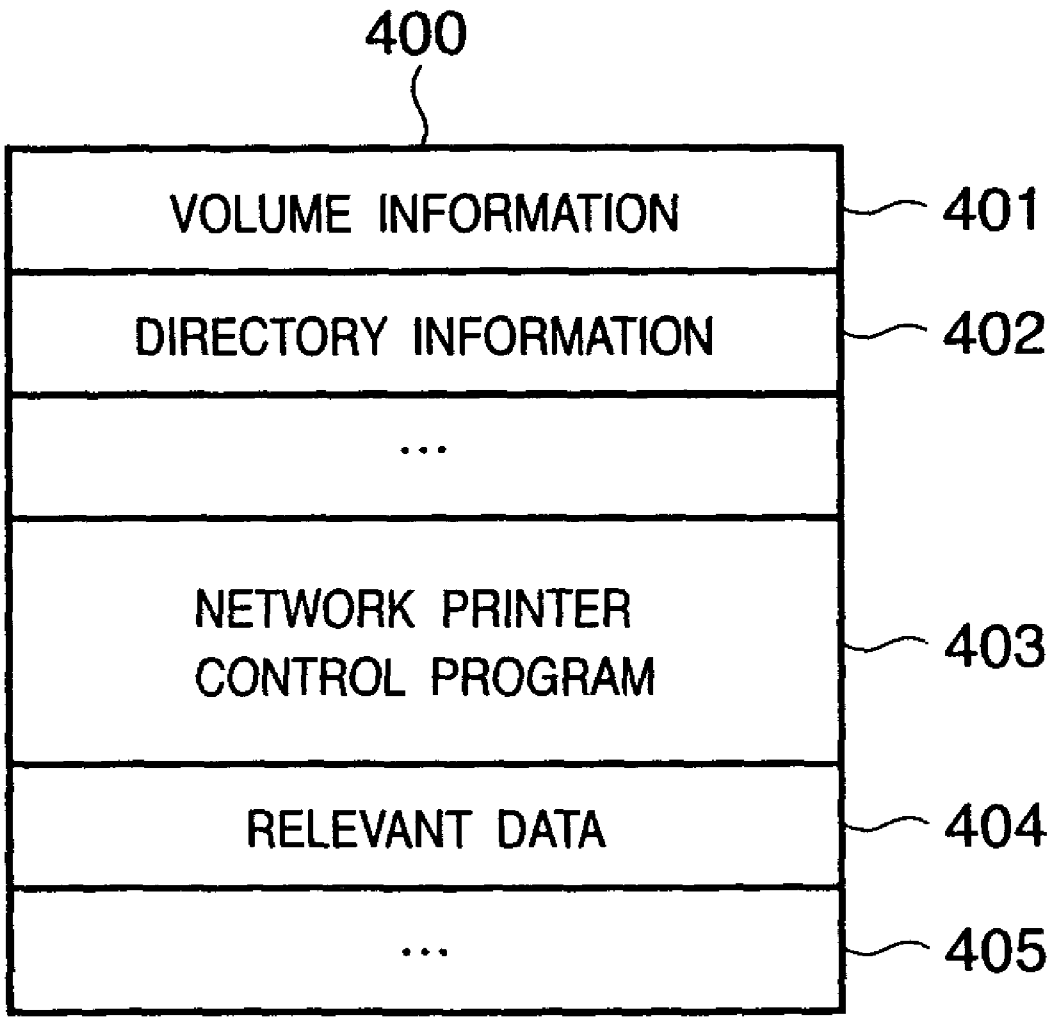
FIG. 4 is a view showing an example of the memory map of an FD 204 shown in FIG. 2.

FIG. 4 is a view showing an example of the memory map of the FD 204 shown in FIG. 2. In FIG. 4, reference numeral 400 denotes a data content of the FD 204 that includes volume information 401 representing data information, directory information 402, a printing control program 403, and relevant data 404 of the printing control program 403.

FIG. 5 is a block diagram for explaining the hardware configuration of the printers 104 and 105. Each of the network printers 104 and 105 comprises a network print server 520 and printer controller 519 which have independent control systems.

In the network print server 520, reference numeral 501 denotes a network print server CPU. The network print server 520 can communicate with a plurality of external apparatuses (e.g., host computer) (not shown) connected to a local area network (LAN) 512 by using a predetermined network communication protocol. Based on a control program stored in a rewritable flash ROM 503, the CPU 501 comprehensively controls print data and various data transmission/reception requests (e.g., printer control instruction) sent from an external apparatus via a network controller (LANC) 505 connected to a system bus 504. The CPU 501 also performs proper data transfer control to the printer controller 519 connected via an expansion interface controller (EXPC) 507.

A RAM 502 is used as a temporary storage area such as a main memory or work area for the CPU 501. An LED 506 is used as a display representing the operating state of the network print server. For example, the LED 506 can represent, by the flickering pattern or color of the LED, various operating states such as an electrical connection state (LINK) between the network controller 505 and the local area network 512, and a network communication mode (10Base, 100Base, full-duplex, or half-duplex).

The network print server 520 is a network card module serving as a network device, and is separable from the printer controller 519 at an expansion interface 517. That is, the network print server 520 is dismountable from the printer 104 or 105, and mountable in another printer having the same configuration.

In the printer controller 519, reference numeral 508 denotes a printer controller CPU. The CPU 508 operates on the basis of a control program and the like stored in a ROM 509, or a control program, resource data (resource information), and the like which are stored in an external memory 510 connected via a disk controller (DKC 515). The CPU 508 comprehensively controls access to various devices connected to a system bus 511. A raster controller 521 generates print data on the basis of image data received from the network print server 520, and outputs a print image signal to a print engine 516.

Reference numeral 514 denotes a RAM functioning as a main memory, work area, or the like for the CPU 508. The memory capacity of the RAM 514 can be expanded by an optional RAM connected to an expansion port (not shown).

Reference numeral 518 denotes an operation panel (operation unit) having buttons for operation such as setting of the operation modes of the network printers 104 and 105 and deletion of print data, and a display such as a liquid crystal panel or LED representing the operating states of the network printers 104 and 105.

The print engine 516 utilizes an existing printing technique, for example, electrophotography (laser beam printing), ink-jet printing, and sublimatic printing (thermal transfer printing).

Figure 6:
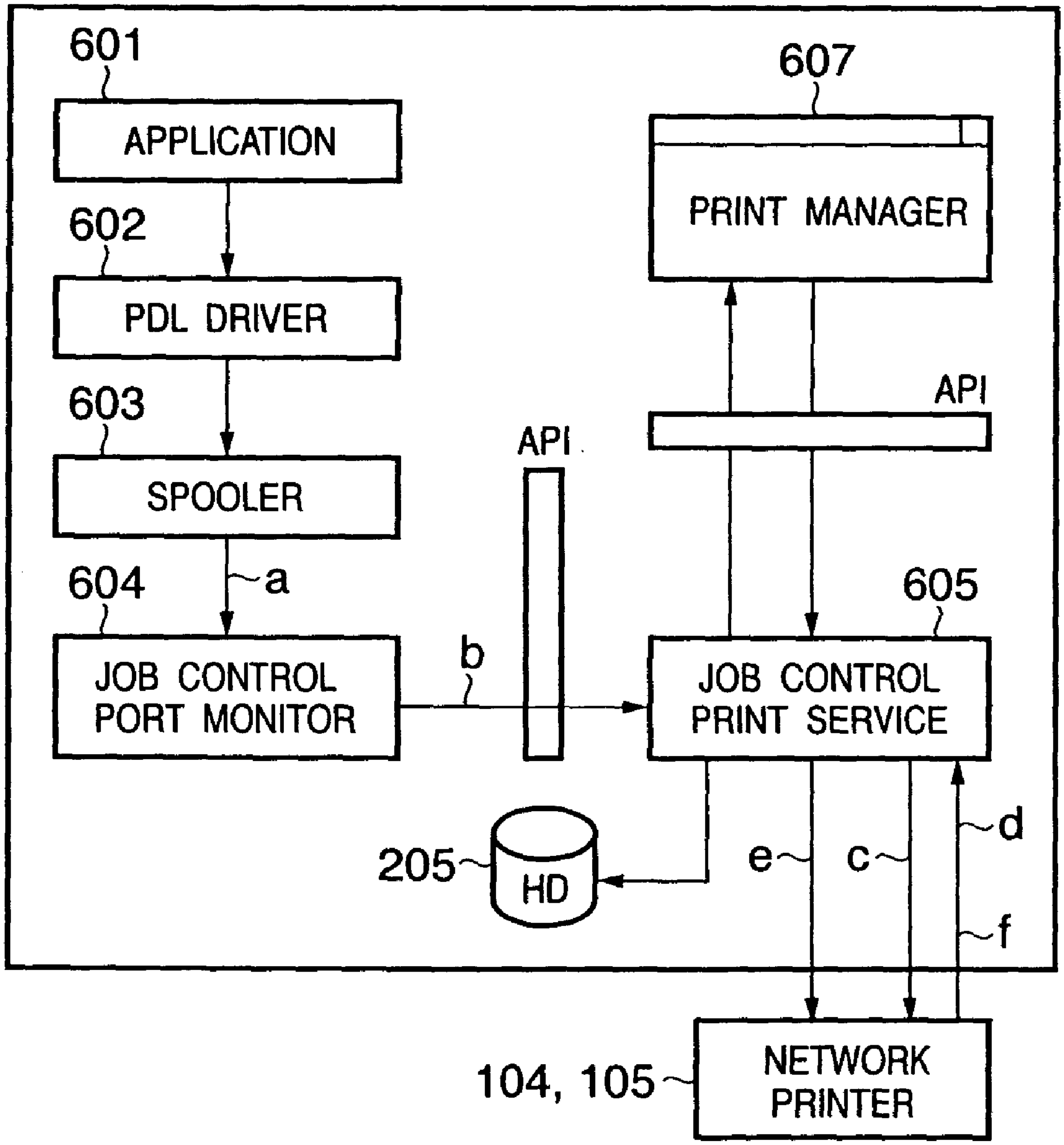
FIG. 6 is a block diagram showing an example of the software configuration of the printing system of the client computers 101 to 103.

The software configuration of the client computers 101 to 103 will be explained. FIG. 6 is a block diagram showing an example of the software configuration of the client computers 101 to 103. Arrows between components indicate how to process a print job containing a drawing command issued by an application. A software configuration represented by each block is executed by the CPU 200 in FIG. 2, realizing a desired function.

Upon reception of a print instruction, a general application program 601 such as Microsoft Word® generates a series of drawing commands via the operating system. A PDL driver 602 receives the drawing commands generated via the operating system, and generates a print job containing a PDL file interpretable by the network printers 104 and 105 on the basis of the series of drawing commands. In the following description, the PDL driver will be exemplified. However, the present invention is not limited to this driver, and can also be applied to a BDL (Band Description Language), a printer driver which creates a compressed bitmap image, or a form in which print data is generated by an application and operating system without the mediacy of the printer driver.

The PDL driver 602 transfers the print job to a spooler 603. Since the operating system is assumed to be Windows®, the spooler 603 is a Windows spooler. The operating system of a computer to which the present invention is applied is not limited to Windows®, and another operating system such as Unix or Linux can also be applied as far as the operating system has a drawing instruction.

The spooler 603 transfers the print job to a job control port monitor 604 designated by the user via a user interface (arrow a). Print setting information which is set via a printer driver interface and includes the paper size, stapling designation, and the like is also transmitted to the job control port monitor 604. The job control port monitor 604 transmits the pieces of information to a job control print service 605 (arrow b).

The job control print service 605 has a function of managing a transferred print job and the device status. The job control print service 605 also has a function of managing information such as a device status and job status sent from the network printers 104 and 105, and a function of issuing a predetermined instruction to the network printers 104 and 105. These functions correspond to a function of managing device information and job information of the network printers 104 and 105.

The job control print service 605 issues a print request to the print job order management function of the network printers 104 and 105 before transmitting print data to the network printers 104 and 105. In accordance with print instructions from the network printers 104 and 105, the job control print service 605 transmits print data to the network printers 104 and 105 (arrows c, d, and e).

When the network printers 104 and 105 confirm the completion of print data, they notify the job control print service 605 of the completion of printing (arrow f). The network printers 104 and 105 also notify the job control print service 605 of their statuses (arrow f).

A print manager 607 is a program which allows the user to check the status of a print job in the job control print service 605, and provides a user interface for operating a print job. The print manager 607 exchanges information and instructions with the job control print service 605 via a software interface (API: Application Program Interface) of the job control print service 605.

The print manager 607 has a function of mainly acquiring, as an event, status information of the network printers 104 and 105 that is managed by the job control print service 605. The type of event notification is assumed to be a warning that the remaining toner amount runs short, an error/warning information notification (e.g., a communication error between the client computers 101 to 103 and a device, a shortage of the memory, or full loading on the delivery tray), or a normal state information notification that the apparatus returns from an error state to a normal state. The job control print service 605 has a function of accepting a status notification such as a power control status or error information (paper jam) during printing by each device (printing apparatus) communicable via a network.

As a more detailed process, the print manager 607 issues to the job control print service 605 an event which designates a device. The job control print service 605 recognizes a device status based on the issued event, and notifies the print manager 607 of a result based on monitoring.

<Flow of Print Job>

The flow of a print job from the application 601 to the network printer 104 or 105 will be explained with reference to FIG. 7. The same reference numerals as in FIG. 6 denote the same software components, and a detailed description of the functions will be omitted.

Figure 7:
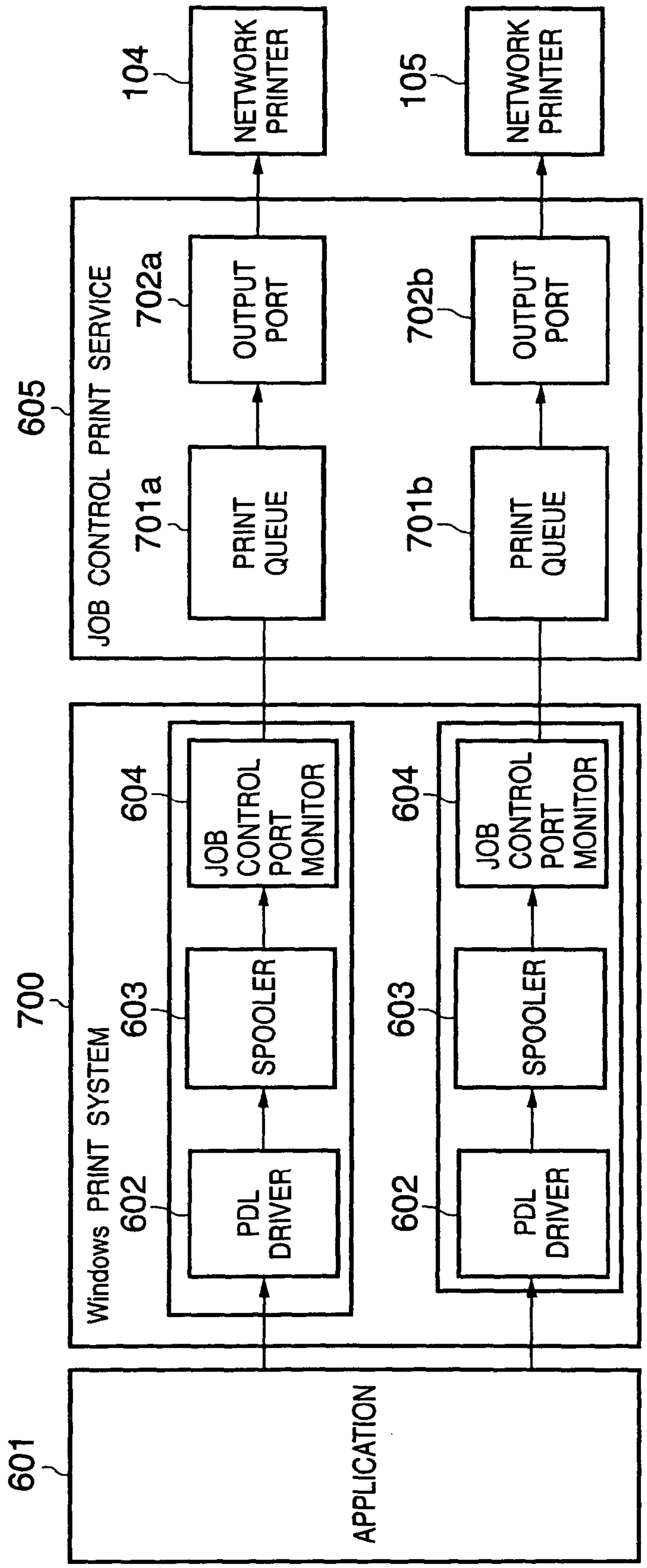
FIG. 7 is a block diagram showing the flow of a print job in printing by the client computers 101 to 103.

As shown in FIG. 7, the PDL driver 602, spooler 603, and job control port monitor 604 are conceptually prepared for each of the network printers 104 and 105. In the first embodiment, the operating system is Windows®, and these components will be called a Windows print system 700 as a whole.

The job control print service 605 includes print queues 701*a* and 701*b* and output ports 702*a* and 702*b* which correspond in number to the network printers 104 and 105.

In printing, the application 601 designates a printer and issues a print instruction. A print job generated by the PDL driver 602 on the basis of the print instruction is transferred from the job control port monitor 604 to the job control print service 605. The print job information is held in the print queue 701*a* and 701*b*, and print job acceptance instructions are issued to the output ports 702*a* and 702*b*. Upon acceptance of the print job, the output ports 702*a* and 702*b* issue schedule requests to the schedulers of the network printers 104 and 105 that correspond to IP addresses set at the output ports. The schedulers of the network printers 104 and 105 perform a scheduling process for jobs accepted from the client computers 101 to 103, and issue print instructions to the output ports 702*a* and 702*b*. Upon acceptance of the print instructions, the output ports 702*a* and 702*b* transmit print data to the network printers 104 and 105.

Figure 8:
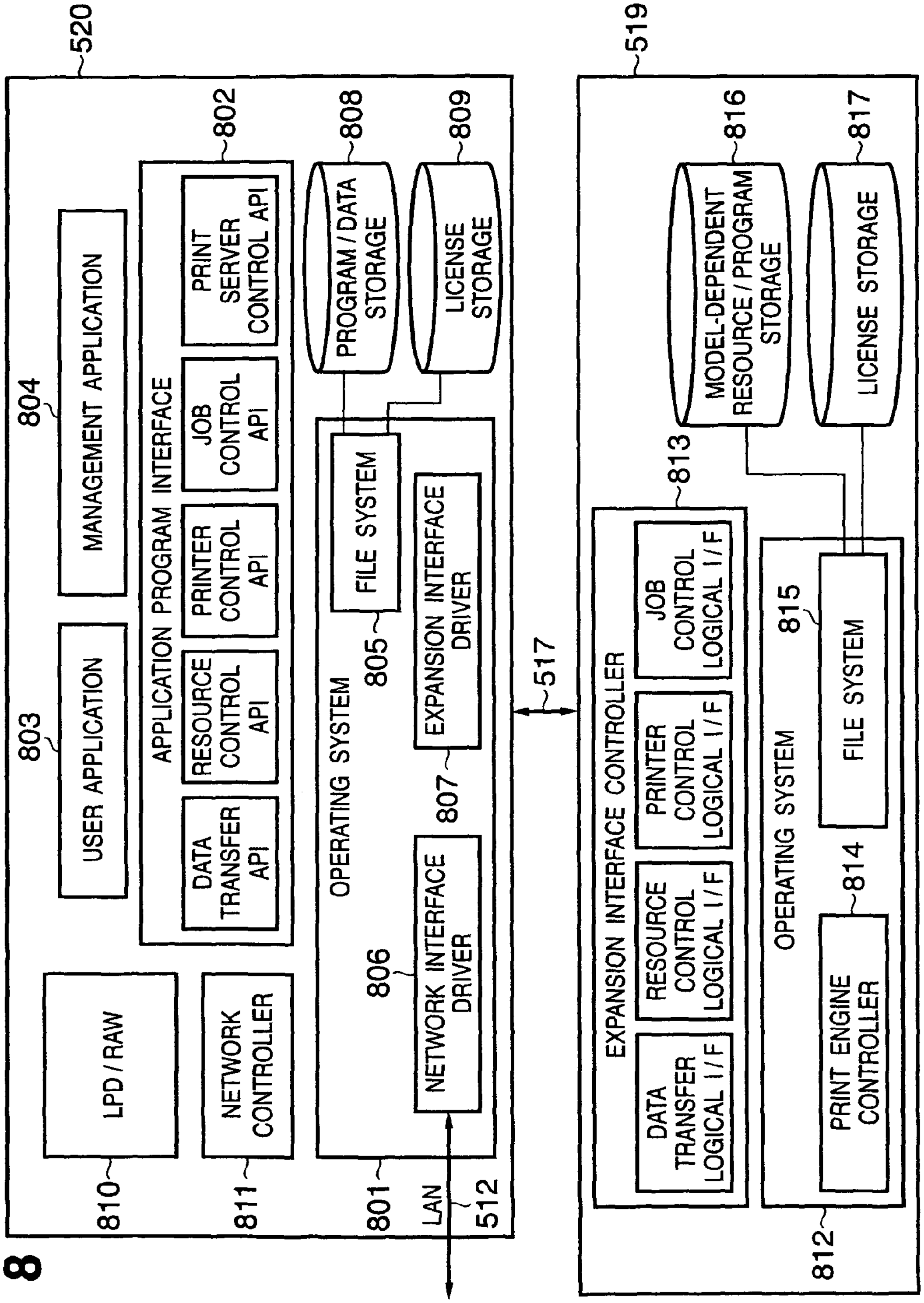
FIG. 8 is a block diagram showing an example of the software configuration of the printer.

FIG. 8 is a block diagram for explaining the configuration of control programs stored in the storage devices of the network print server 520 and printer controller 519. The control programs are analyzed and processed by the CPUs 501 and 508 of the network print server 520 and printer controller 519.

Reference numeral 801 denotes an operating system which supervises basic data input/output control of the network print server 520. The operating system 801 incorporates a file system 805 which controls input/output to/from a program/data storage 808, an expansion interface driver 807 which controls communication with the printer controller 519 via the expansion interface 517, and a network interface driver 806 which communicates with an external device via the LAN 512.

Reference numeral 802 denotes an application program interface (API) which provides various functions of the operating system to application programs such as a user application 803 running in the network print server 520 and a management application for registering and managing the network printers 104 and 105 and a user application. The application program interface 802 comprises a data transfer API which provides a print data transmission/reception function, a resource control API which controls input/output of resource data such as a bitmap image and display message, a printer control API which controls reactivation of the network printers 104 and 105, initialization and setting of set values, and the like, a job control API which controls cancellation of a print job, a re-print instruction, and the like, and a print server control API which performs reactivation of the network print server 520, initialization and setting of set values, and activation, registration, and deletion of an application program.

Reference numeral 812 denotes an operating system which supervises various process control operations of the printer controller 519. The operating system 812 incorporates a print engine controller 814 which controls communication with the print engine, and a file system 815 which controls input/output to/from a model-dependent resource/program storage. The model-dependent resource/program storage stores model-dependent resources such as a bitmap image and error message to be referred to by the network print server 520, and model-dependent application programs which run on the network print server.

Reference numeral 813 denotes an expansion interface controller which controls communication with the network print server 520 via the expansion interface 517. The expansion interface controller comprises a data transfer logical interface which controls input/output of print data for each type of control, a resource control logical interface which controls input/output of various data stored in a model-dependent resource/program storage 816, a printer control logical interface which controls reactivation of the network printers 104 and 105, initialization and setting of set values, and the like, and a job control logical interface which controls cancellation of a print job, a re-print instruction, and the like. The expansion interface controller 813 transfers instructions from the network print server 520 via the respective logical interfaces to the operating system 812, and sends back process results to the network print server 520.

Reference numeral 811 denotes a network controller which accepts a reception notification when the network interface driver 806 accepts notifications from the client computers 101 to 103 via the LAN 512. The network controller 811 is a module capable of controlling communication and determining which client computer communicates.

Reference numeral 810 denotes an LPD/RAW module which controls a protocol for accepting print data transmitted from the client computers 101 to 103, and can transfer the accepted print data to the printer controller 519. The user application 803 is stored in the program storage 816 of the printer controller 519 or the program storage 808 of the network print server 520. When the network printer 104 or 105 is activated, the license of an application that is stored in the program storage 808 or a license storage 809 is compared with a license which is stored in the program storage 816 or a license storage 817, and it is determined whether these licenses agree with each other. If so, the application program is determined to be proper, and the application program is loaded into the RAM 514 of the network print server 520.

Figure 9:
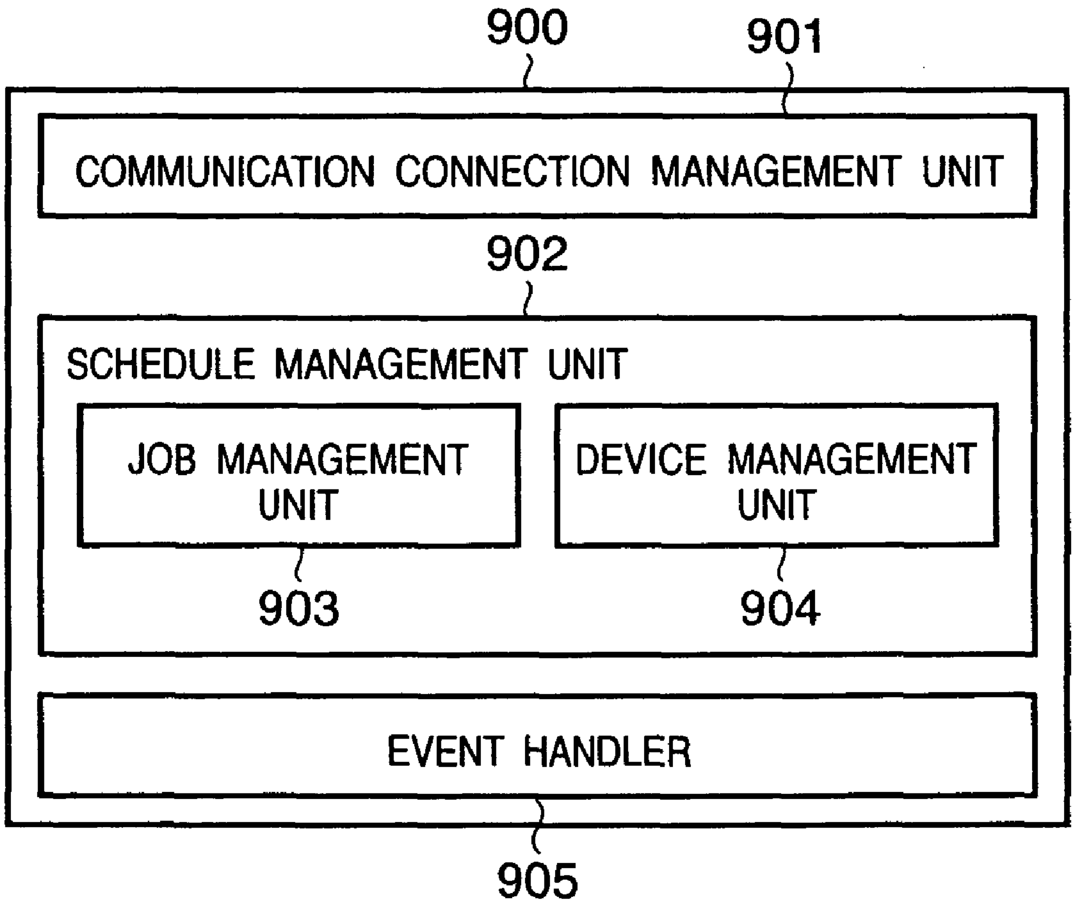
FIG. 9 is a block diagram showing an example of the software configuration of the user application of the printer.

The software configuration of a device scheduler 900 which is an application executed by the network print server 520 will be explained with reference to FIG. 9.

Reference numeral 901 denotes a communication connection management unit which manages the connection states of the client computers 101 to 103 which perform printing, and information to be sent to the client computers 101 to 103. The communication connection management unit 901 manages client information on a connected client computer by a client management queue. The communication connection management unit 901 communicates with the client computers 101 to 103 via the data transfer API of the application program interface 802 and the network interface driver 806.

Reference numeral 902 denotes a schedule management unit which schedules print jobs accepted from the client computers 101 to 103, and comprises a job management unit 903 and device management unit 904.

The job management unit 903 manages schedule requests issued by the client computers 101 to 103, and jobs having undergone printing by the client computers 101 to 103.

The device management unit 904 accepts via an event handler 905 the printer status of the printer controller 519 and the status of an accepted print job. The device management unit 904 notifies the communication connection management unit 901 and job management unit 903 of an event accepted from the printer controller 519.

FIG. 10 is a view showing information managed by the communication connection management unit 901.

Reference numeral 1002 denotes client information including client IDs assigned to respective connected client computers by the communication connection management unit 901, the IP addresses of the connected client computers 101 to 103, and the types of events registered by the connected client computers 101 to 103. The type of event includes the types of device status event and job status event which are issued by the printer controller 519.

Reference numeral 1001 denotes a client management queue which holds client information on the connected client computers 101 to 103 in a queue. When sessions with the client computers 101 to 103 start, information on the client computers 101 to 103 is registered in the management queue. When sessions end, the client information is deleted.

Figure 11:
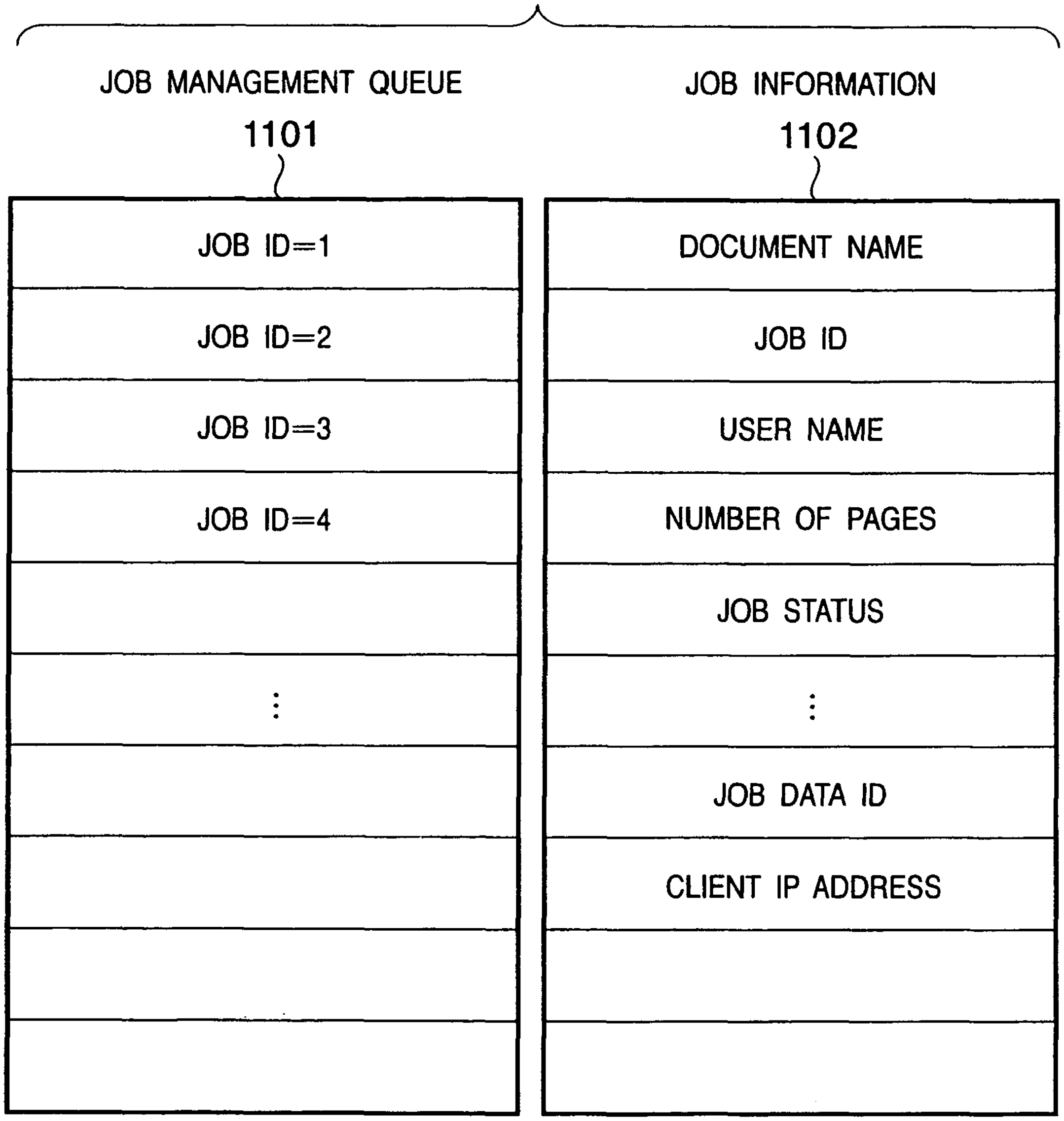
FIG. 11 is a view showing job information and a job management queue which are managed by the device scheduler 900.

FIG. 11 is a view showing pieces of job information added to schedule requests issued by the client computers 101 to 103, and a job management queue which manages pieces of generated job information. These pieces of information are managed by the job management unit 903.

Reference numeral 1102 denotes print job information which is added to schedule requests issued by the client computers 101 to 103 in order to start printing. The document names of print jobs, a job ID issued by the job management unit 903, user names under which printing starts in the client computers 101 to 103, the number of pages of a job, a job status representing the status of a print job, job data IDs contained in print data transferred from the client computers 101 to 103, and the IP addresses of the client computers 101 to 103 which designate printing are registered in the print job information 1102.

The job status represents a status until no job remains in the printer after the client computers 101 to 103 issue print schedule requests. The job status includes "on standby for printing", "schedule-up status", "during transfer", "completion of transfer", and "completion of printing".

The job data ID is a job ID contained in print data, and is added when a job status in the printer controller 519 is announced.

Reference numeral 1101 denotes a job management queue which manages job information 1102 corresponding to each of jobs. When a schedule request is accepted from each of the client computers 101 to 103, the job information 1102 is registered in the job management queue 1101. After printing based on a print job ends, the job information is deleted from the job management queue 1101.

Figure 12:
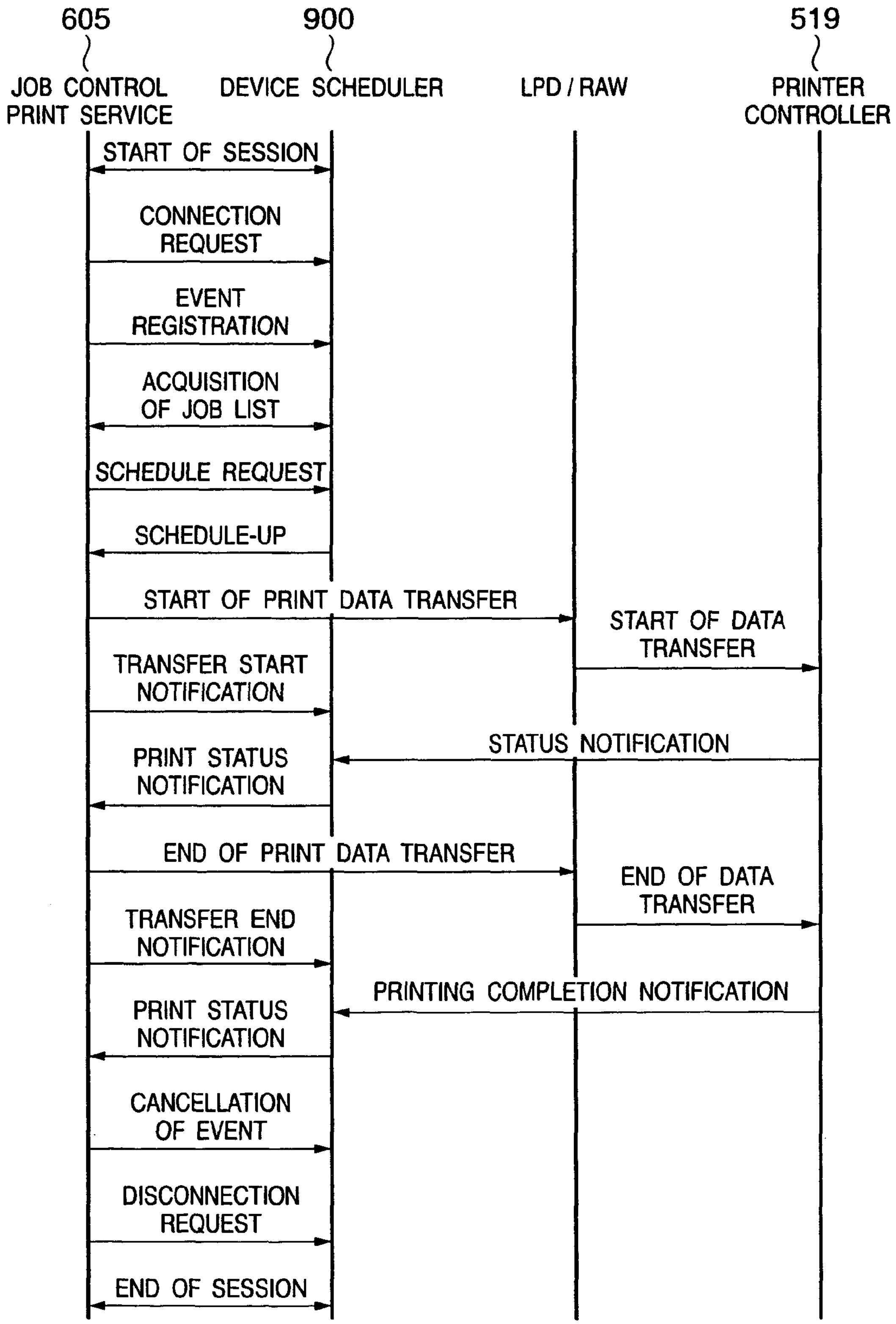
FIG. 12 is a chart showing a print sequence between a job control print service 605, the device scheduler 900, an LPD/RAW 810, and a printer controller 519.

FIG. 12 shows exchange of data until the network printer 104 or 105 ends printing after the job control print service 605 of at least one of the client computers 101 to 103 accepts a job from the job control port monitor 604 and issues a schedule request to the network printer 104 or 105.

When the job control print service 605 accepts a job from the job control port monitor 604, it starts session connection with the device scheduler 900. The job control print service 605 issues a connection request which notifies the device scheduler 900 of information on the client computer, an event registration request for causing the device scheduler 900 to notify the job control print service 605 of a job/device status, and a job list request for acquiring information of a job whose schedule is managed by the device scheduler 900.

Upon acceptance of the connection request, the device scheduler 900 registers, in the client management queue 1001, client information on the client computer which has transmitted the connection request. Upon acceptance of the event registration request, the device scheduler 900 sets a registration-requested event (to be referred to as a registration event hereinafter) in part of the client information. Upon acceptance of the job list request, the device scheduler 900 transmits a list of job information registered in the job management queue 1101 to the job control print service 605.

The job control print service 605 of at least one of the client computers 101 to 103 issues, as a print request, a schedule request command for reserving printing to the device scheduler 900. Upon acceptance of the schedule request as the print request, the device scheduler 900 stores job information in the job management queue 1101 to register the accepted print request. The job information contains information representing a document name and the like. When the network printers 104 and 105 become acceptable to print data, the device scheduler 900 issues schedule-up to the job control print service 605, and prompts the job control print service 605 to start transmission of print data.

After issuing schedule-up, the device scheduler 900 updates the job status of the job information 1102 to the schedule-up status.

Upon acceptance of schedule-up from the device scheduler 900, the job control print service 605 starts transferring print data to the LPD/RAW 810. After transfer starts, the job control print service 605 notifies the device scheduler 900 of the start of transfer. The LPD/RAW 810 is a module which controls a protocol for accepting print data addressed to the network print server 520. Upon reception of the transfer start notification, the device scheduler 900 updates the job status of the job information 1102 to "during transfer".

When the LPD/RAW 810 accepts print data, it transfers data to the printer controller 519, and the printer controller 519 starts printing on the basis of the data. After printing starts, the printer controller 519 notifies the device scheduler 900 of the job status. The device scheduler 900 notifies a client computer corresponding to the client information of the job status on the basis of the registration event information in the client information.

After transfer of print data ends, the job control print service 605 transmits a transfer end notification to the device scheduler 900. Upon reception of the transfer end notification, the device scheduler 900 updates the job status of the job information 1102 to "completion of transfer".

After the printer controller 519 ends the print process, it notifies the device scheduler 900 of the completion of printing as a job status. The device scheduler 900 notifies the client computer corresponding to the client information of the completion of printing as a job status on the basis of the registration event information in the client information.

After the job control print service 605 confirms the completion of printing from the printing completion notification, it need not receive any notification from the device, and issues to the device scheduler 900 a request to cancel any event notification. Upon acceptance of the request to cancel any event notification, the device scheduler 900 sets, in part of the client information, information that no event is sent.

After that, the job control print service 605 issues a disconnection request to end connection with the device scheduler 900, and ends the session.

Upon acceptance of the disconnection request, the device scheduler 900 deletes, from the client management queue 1001, the client information corresponding to the client computer which has transmitted the disconnection request, and ends communication with at least one of the client computers 101 to 103.

Figure 13:
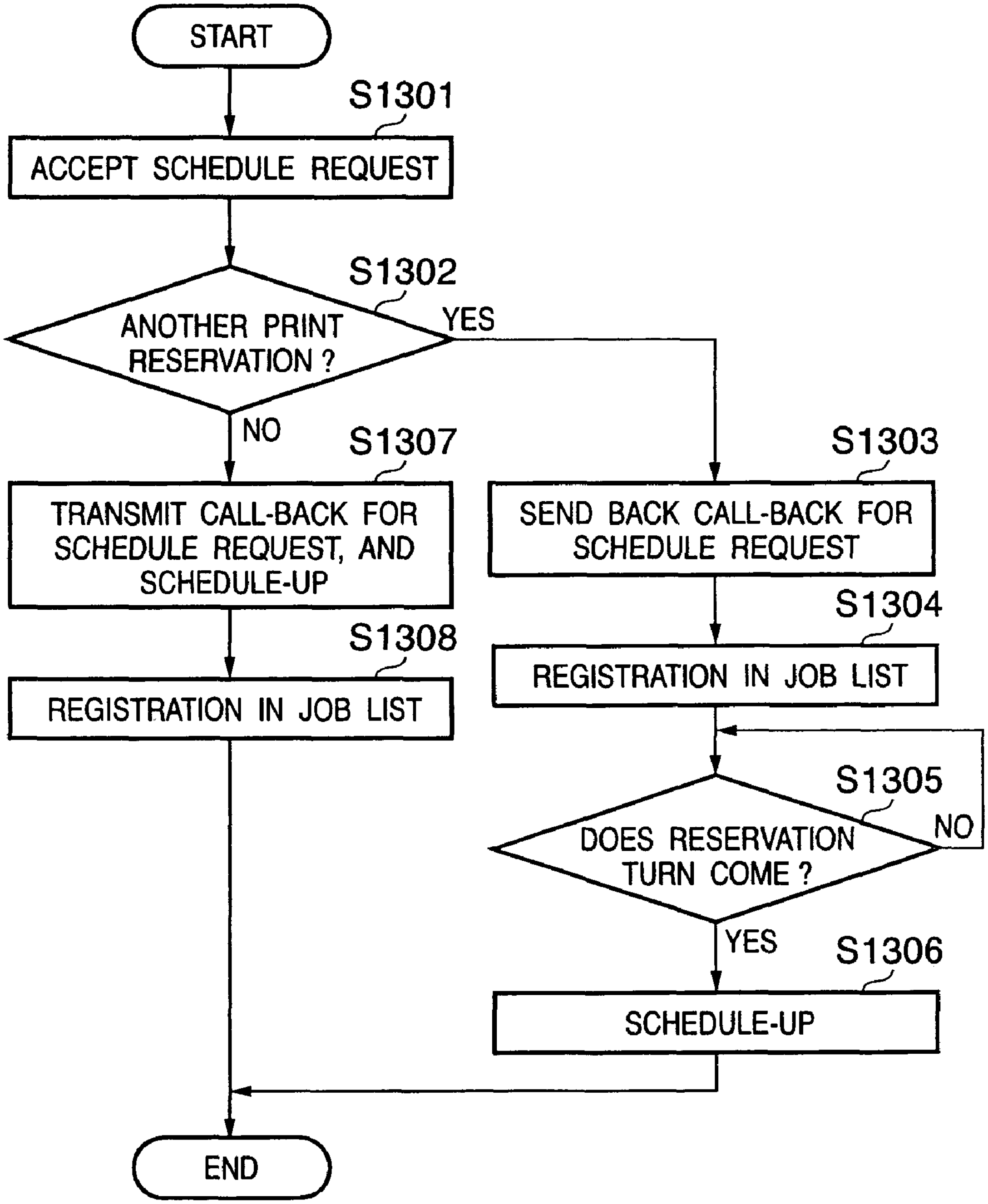
FIG. 13 is a flowchart showing the flow of a process in the schedule management unit of the device scheduler 900 until schedule-up is issued after a schedule request is accepted from the job control print service.

FIG. 13 shows the flow of a process in the schedule management unit 902 until schedule-up is issued after a schedule request is accepted from the job control print service 605. The difference in a schedule-up process depending on the presence/absence of a job managed by the device scheduler 900 will also be explained.

In step S1301, the device scheduler 900 accepts a schedule request from at least one of the client computers 101 to 103.

In step S1302, the schedule management unit 902 of the device scheduler 900 determines whether another managed job (another print reservation) exists. If another managed job exists, the process advances to step S1303; if no managed job exists, to step S1307. Determination (step S1302) of whether a job exists is based on whether a job exists in the job management queue 1101 managed by the job management unit 903 of the device scheduler 900. (The queue count of the job management queue 1101 is 0 when no job exists, and 1 or more when jobs exist.)

In step S1303, the schedule management unit 902 transmits call-back for the schedule request accepted in step S1301. In step S1304, the schedule management unit 902 registers job information added to the accepted schedule request in the job management queue 1101.

In step S1305, the schedule management unit 902 confirms whether a job corresponding to the job information registered in the job management queue 1101 in step S1304 is subjected to schedule-up. If YES in step S1305, the process advances to step S1306, the schedule management unit 902 issues schedule-up to the client computer which has transmitted the schedule request in step S1301, and the process ends. If NO in step S1306, the process returns to step S1305.

If the schedule management unit 902 determines in step S1302 that no job exists, it issues schedule-up in step S1307 successively after transmitting call-back for the schedule request. Schedule-up means "to request (instruct) a client computer to start transfer of print data". In step S1308, the schedule management unit 902 registers the job information added to the accepted schedule request in the job management queue 1101, and the process ends.

In this manner, when it is confirmed upon acceptance of a schedule request that another job (another print reservation) exists, schedule-up is transmitted to the job control print service 605, and print data transferred from the job control print service 605 is accepted before job information is registered in the job management queue 1101. The first printing can be achieved quickly in comparison with a conventional case in which job information is registered in the job management queue 1101, the reservation order is confirmed, and then schedule-up is issued.

Figure 14:
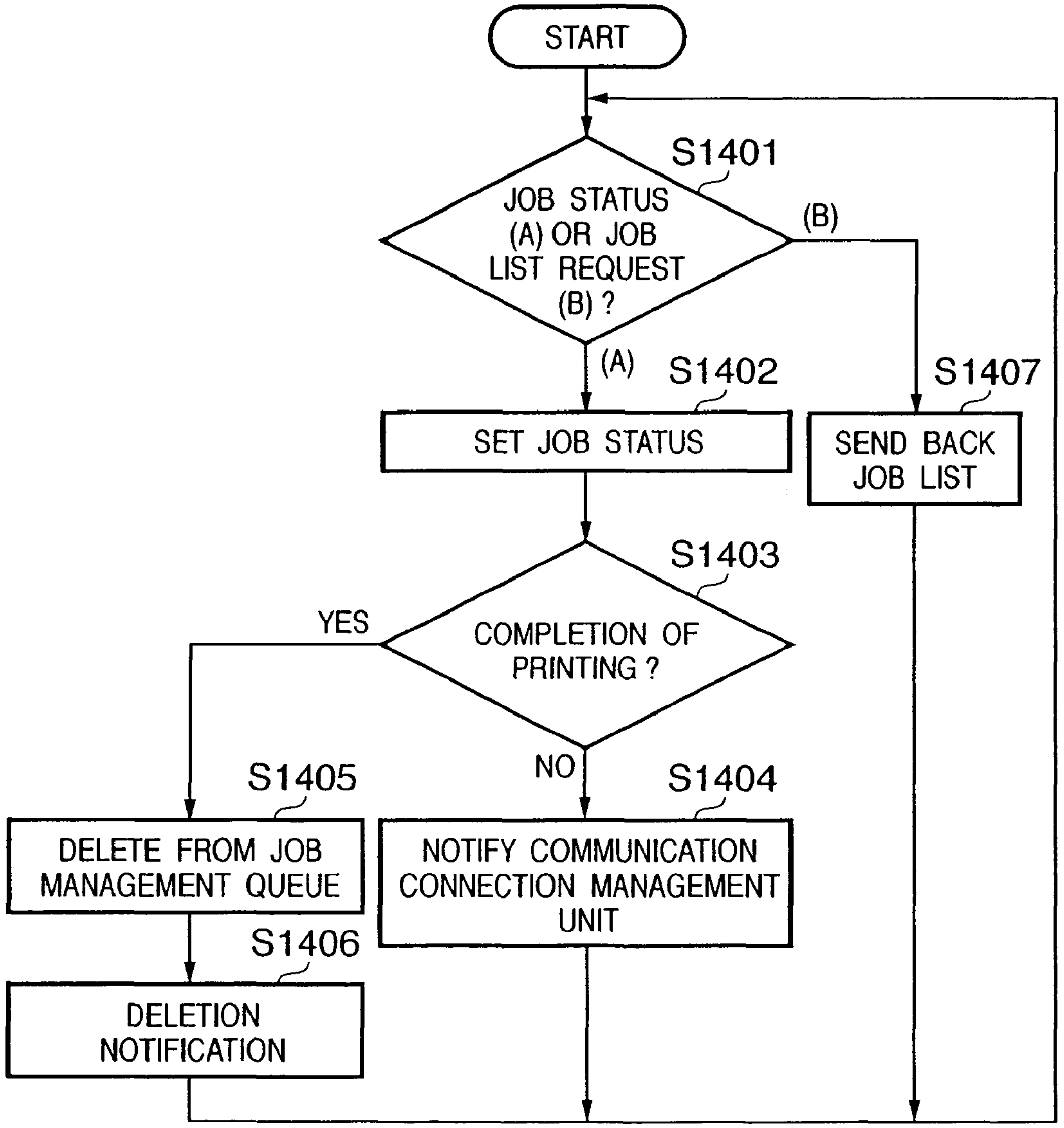
FIG. 14 is a flowchart showing a process when a job list request is accepted upon acceptance of a job status notification event from a job management unit 903.

FIG. 14 shows the process of the job management unit 903 upon acceptance of a job status notification from the device management unit 904 and acceptance of a job list request from the job control print service 605.

In step S1401, when the job management unit 903 accepts a notification from the communication connection management unit 901 or device management unit 904, the job management unit 903 determines whether the notification is a job status notification from the device management unit 904 or a job list request from the job control print service 605.

If the notification is determined to be a job status notification from the device management unit 904, the job management unit 903 updates the job status in the job information 1102 of the job in accordance with the job status notification. In step S1403, the job management unit 903 determines whether the job status notification is a printing completion notification. If the notification is determined not to be a printing completion notification, the job management unit 903 instructs in step S1404 the communication connection management unit 901 to issue a job status notification to the client computers 101 to 103.

If the notification is determined in step S1403 to be a printing completion notification, the job management unit 903 deletes job information of the job from the job management queue 1101 in step S1405. In step S1406, the job management unit 903 instructs the communication connection management unit 901 to issue a job completion notification to the client computers 101 to 103. Thereafter, the process shifts to step S1401.

If it is determined in step S1401 that the notification is a job list request from the job control print service 605, the job management unit 903 instructs in step S1407 the communication connection management unit 901 to transmit a list of job information registered in the job management queue 1101 to the requesting client computer. At the same time, the job management unit 903 transfers the job information list to the communication connection management unit 901.

Figure 15:
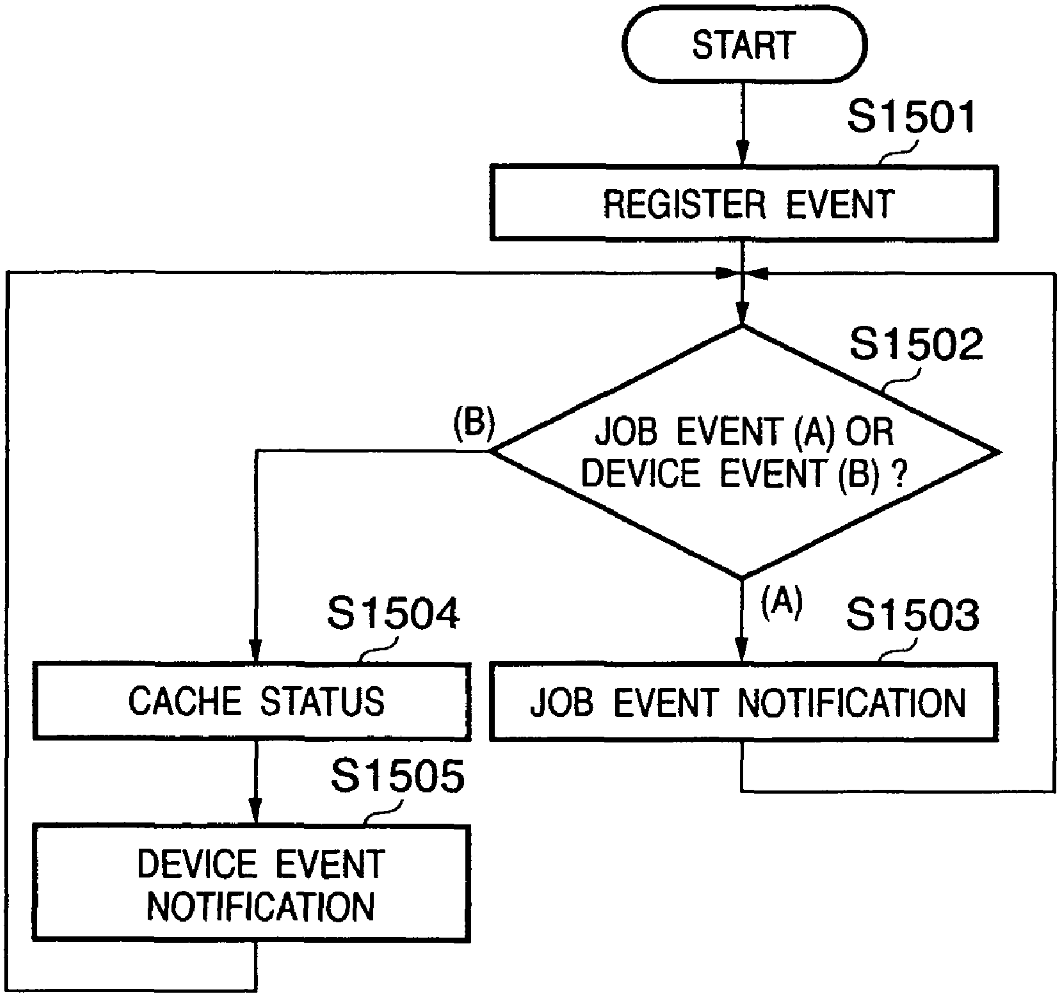
FIG. 15 is a flowchart showing the process of a device management unit upon acceptance of a device status and job status notification from the printer controller 519.

FIG. 15 shows the process of the device management unit 904 which accepts a device status notification and job status notification from the printer controller 519 via an event handler, and notifies the job management unit 903 and communication connection management unit 901 of them.

In step S1501, the device management unit 904 executes an event registration process via the event handler so as to instruct the printer controller 519 to notify the device management unit 904 of the device status and print job status when the device status changes or the status of a print job processed by the printer controller 519 changes.

In step S1502, if the device management unit 904 accepts via the event handler an event generated in the printer controller 519, the device management unit 904 determines whether the event is a job event or device event. If the event is a job event, the device management unit 904 notifies the job management unit 903 of the job status in step S1503, and the process shifts to step S1502. If the event is a device event, the device management unit 904 holds the device status in step S1504, and notifies in step S1505 the communication connection management unit 901 of the device status. Then, the process shifts to step S1502.

Figure 16:
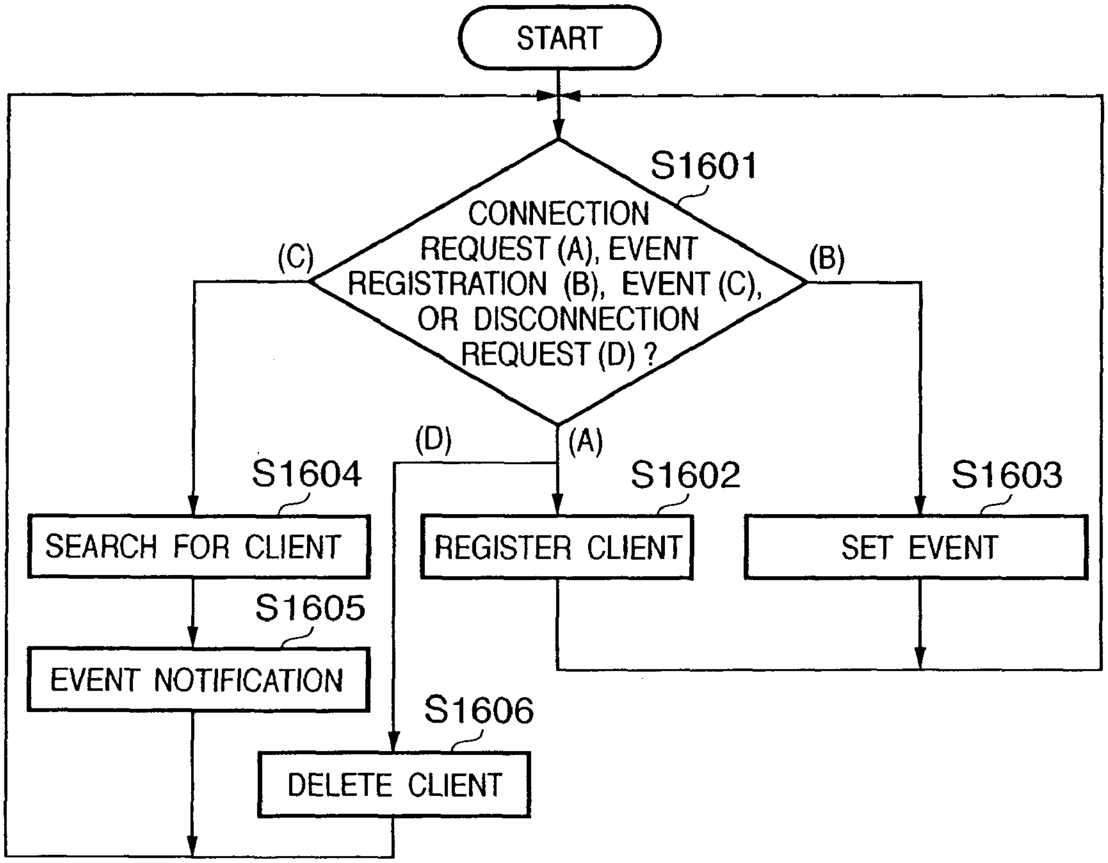
FIG. 16 is a flowchart showing the process of a communication connection management unit 901 which processes requests and notifications from the client computers 101 to 103, notifications from the device management unit, and requests and notifications to the job management unit 903.

FIG. 16 shows the flow of a process in the communication connection management unit 901 which processes requests and notifications from the client computers 101 to 103, notifications from the device management unit 904, and requests and notifications to the job management unit 903.

In step S1601, the communication connection management unit 901 accepts notifications or requests from the client computers 101 to 103, device management unit 904, or job management unit 903. In step S1602, the communication connection management unit 901 determines the contents of each notification or request.

If the requests or notifications accepted in step S1601 are connection requests from the client computers 101 to 103, the communication connection management unit 901 sets client IDs issued by the communication connection management unit 901 and the IP addresses of the requesting client computers in the client management queue 1001, and registers client information in the client management queue 1001 in step S1602.

If the requests or notifications accepted in step S1601 are event registration requests from the client computers 101 to 103, the communication connection management unit 901 sets the type of event to be sent in client information on the client computers in step S1603. The type of event includes a job event representing a change in job status and a device event representing a change in device status.

If the requests or notifications accepted in step S1601 are a device status from the device management unit 904 and a job status from the job management unit 903, the communication connection management unit 901 recognizes in step S1604 client computers which are to be notified of these statuses. For this purpose, the communication connection management unit 901 refers to the registration event setting in all pieces of client information registered in the client management queue 1001, and determines whether to notify each client computer of the device status or job status. If the communication connection management unit 901 determines that the client computers are to be notified of the status, the communication connection management unit 901 notifies the client computers of the device status or job status in accordance with the IP addresses of all the target client computers in step S1605.

If the requests or notifications accepted in step S1601 are disconnection requests from the client computers 101 to 103, the communication connection management unit 901 deletes, from the client management queue 1001 in step S1606, pieces of client information on the client computers which have transmitted the disconnection requests.

Figure 17:
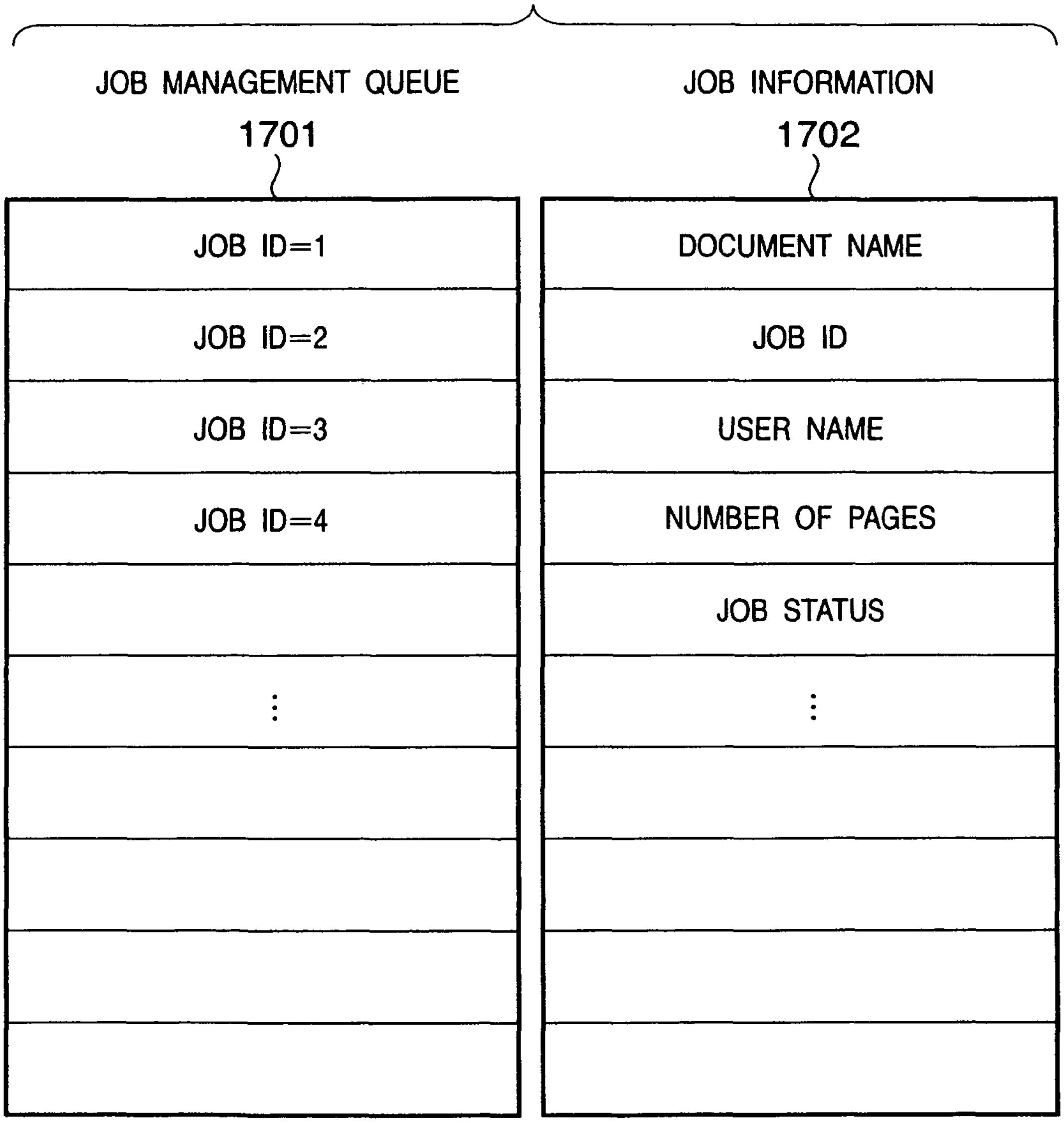
FIG. 17 is a view showing print job information and a job management queue which are managed by the job control print service.

FIG. 17 shows job information of a print job managed by the job control print service 605, and the job management queue which manages pieces of job information of jobs.

Reference numeral 1702 denotes job information of a print job from a client computer and job information of a print job from another client computer that is sent from the device scheduler 900 when a job event is registered in the device scheduler 900. The job information 1702 contains the document name of a print job, a job ID, a user name under which printing starts in the client computer, the number of pages of a job, a job status representing the status of a print job, and a job data ID contained in print data.

The job status represents a status until no job remains in the printer after the client computers 101 to 103 start printing. The job status includes "during spool", "on standby for printing", "schedule-up status", "during transfer", "completion of transfer", and "completion of printing".

The job data ID is a job ID contained in print data, and is information set for a job event from the device scheduler 900.

Reference numeral 1701 denotes a management queue which manages pieces of job information 1702. Job information of a job having undergone printing by a client computer and job information of another client computer that is sent from the device scheduler 900.

Figure 18:
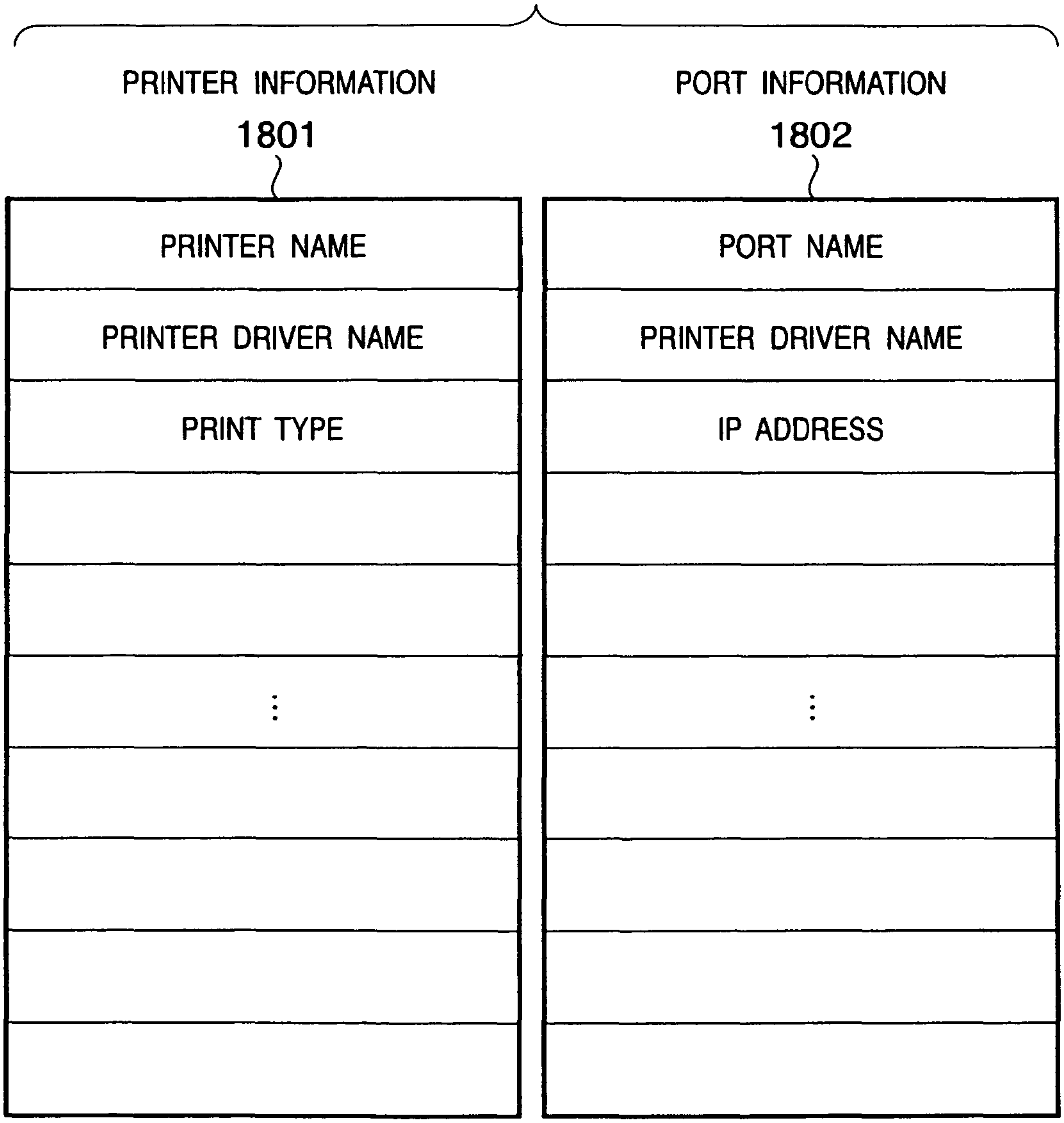
FIG. 18 is a view showing information on a printer queue and output port that is managed by the job control print service.

FIG. 18 shows information on a printer queue and output port that is managed by the job control print service 605.

Reference numeral 1801 denotes printer queue information which is managed by the job control print service and contains information such as a printer name.

Reference numeral 1802 denotes output port information which is managed by the job control print service and contains information such as the IP address of a printing device.

Figure 19:
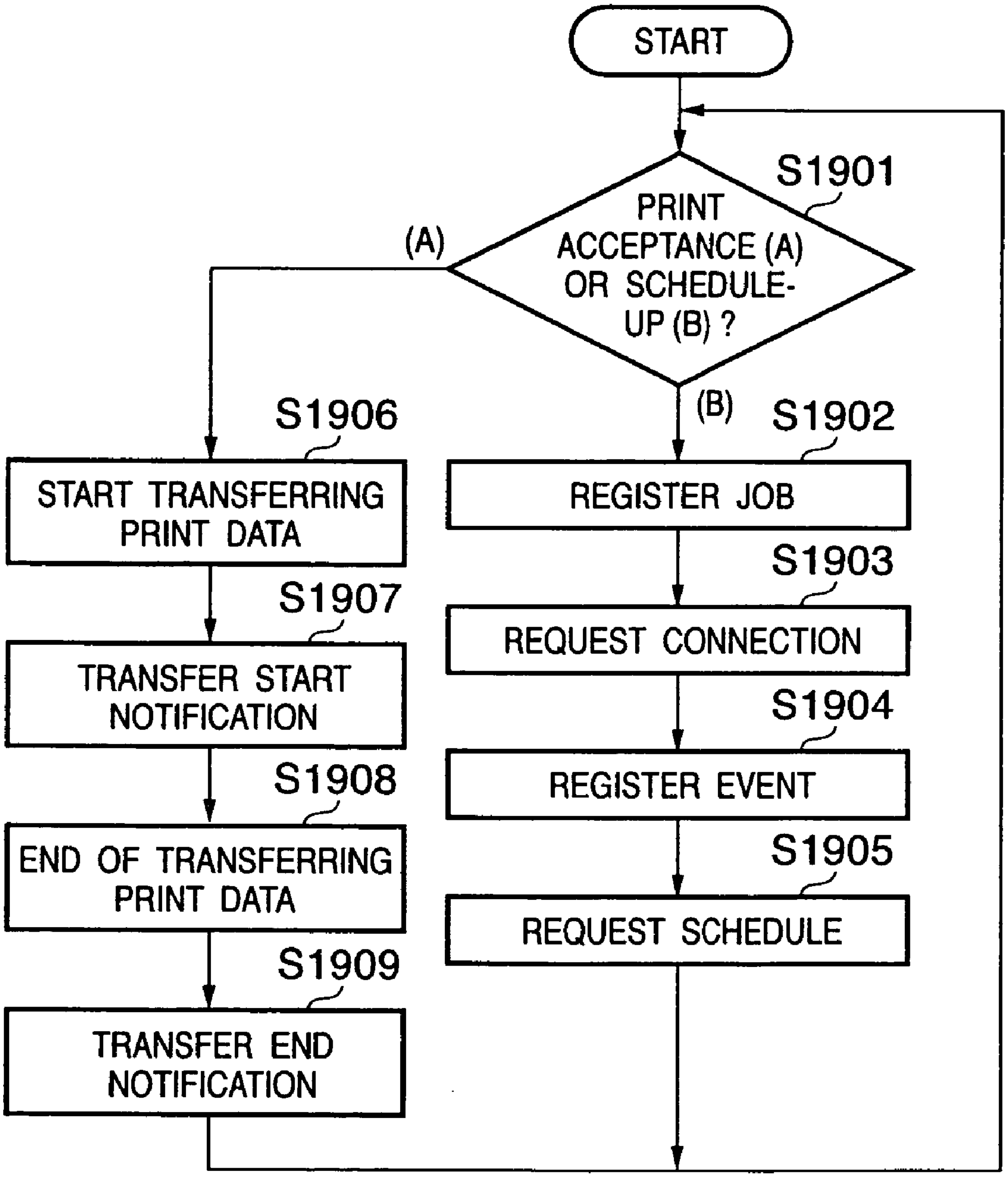
FIG. 19 is a flowchart showing a flow until print data is transferred after the job control print service accepts print data.

FIG. 19 shows a flow until print data is transferred after the job control print services 605 of the client computers 101 to 103 accept print data in the flow of the print process shown in FIG. 12.

In step S1901, the job control print service 605 determines whether to accept a print job from the job control port monitor 604, or a schedule-up command to designate the start of print data transfer from the device scheduler 900. If the job control print service 605 accepts a print job from the job control port monitor 604, the process shifts to step S1902. If the job control print service 605 accepts a schedule-up command, the process shifts to step S1906.

In step S1902, the job control print service 605 registers information of the accepted print job as the job information 1702 in the job management queue 1701.

Information to be set in the job information 1702 can be acquired from the print system or acquired by analyzing print data.

In step S1903, the job control print service 605 issues a connection request command to the device scheduler 900. When the job control print service 605 of at least one of the client computers 101 to 103 issues the connection request, information on at least one of the client computers 101 to 103 is registered in the client management queue 1001 of the device scheduler 900. After that, information can be exchanged between at least one of the client computers 101 to 103 and the device scheduler 900.

In step S1904, the job control print service 605 registers a job event or device event in the device scheduler 900. When a job event is registered, the device scheduler 900 notifies the job control print service 605 of a change in the status of a print job from the corresponding client computer or a change in the status of a print job from another client computer. When a device event is registered, the device scheduler 900 notifies the job control print service 605 of a change in the status of the network printer 104 or 105.

In step S1904, the job control print service 605 acquires a list of jobs registered in the job management queue 1101 managed by the device scheduler 900. With the job list and job event, the job control print service 605 can grasp the print statuses of jobs managed by the device scheduler 900.

By the above process, preparations for printing are completed, and in step S1905, the job control print service 605 transmits a schedule request containing job information of a print job to the device scheduler 900 in order to register the print job in the device scheduler 900.

If it is determined in step S1901 that the job control print service 605 has accepted a schedule-up command as a print data transfer instruction from the device scheduler 900, the process shifts to step S1906. In step S1906, the job control print service 605 starts transferring print data corresponding to the transfer-designated job.

After transfer of the print data starts in step S1906, the job control print service 605 notifies in step S1907 the device scheduler 900 of the start of transfer in order to notify it that transfer of the print data has started.

Transfer of the print data ends in step S1908, and the job control print service 605 notifies in step S1909 the device scheduler 900 that transfer of the print data has ended.

Figure 20:
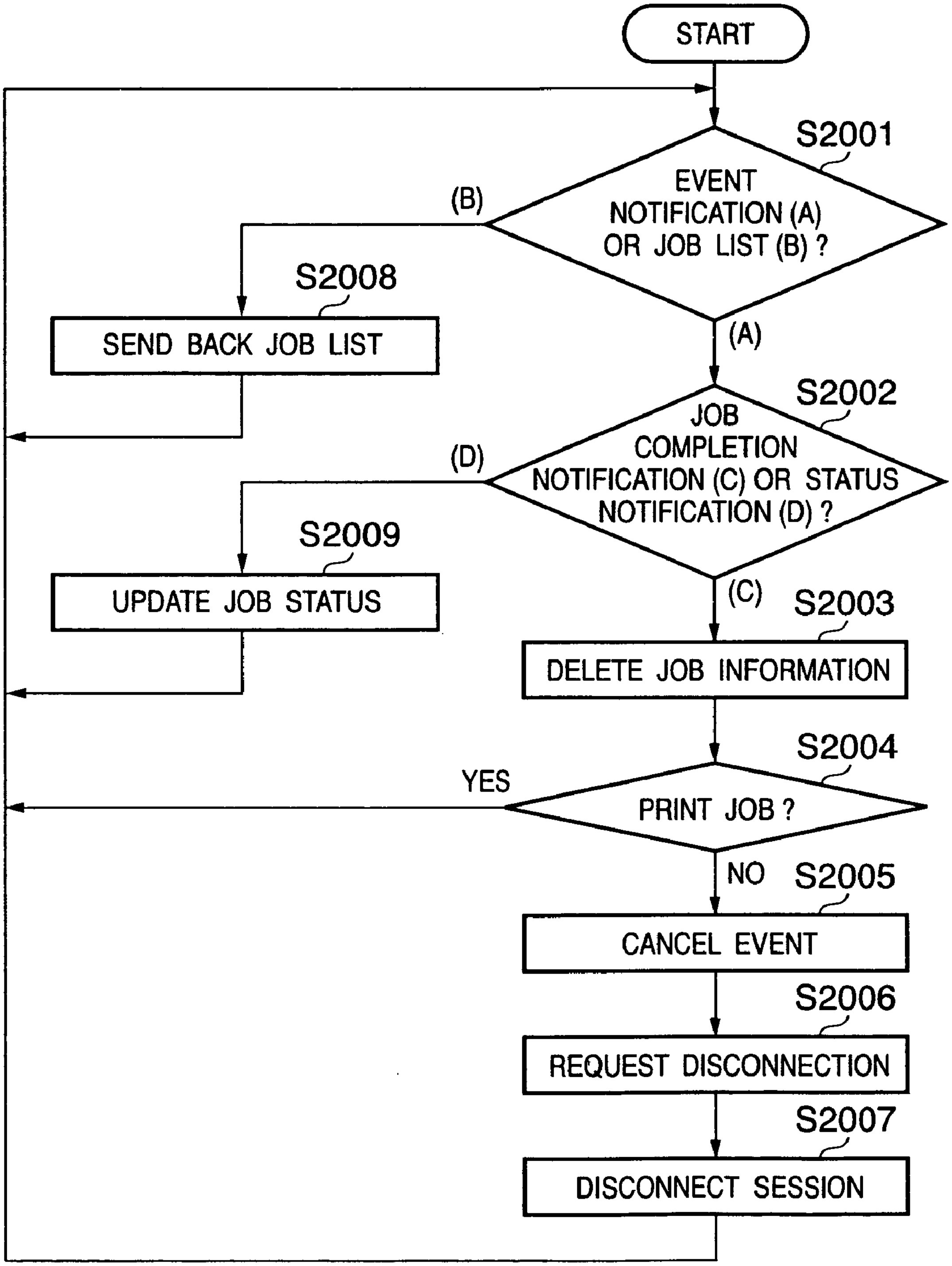
FIG. 20 is a flowchart showing the flow of a process in the job control print service when a notification or command is accepted from the device scheduler 900.

FIG. 20 shows the flow of a process in the job control print service 605 when a notification or command is accepted from the device scheduler 900.

In step S2001, the job control print service 605 determines whether the device scheduler 900 has notified the job control print service 605 of a job status or has sent back a job list. If the job control print service 605 is notified of a job status, the process shifts to step S2002; if it receives a job list, to step S2008.

In step S2008, the job control print service 605 sets job information obtained from the job list in the job management queue 1701 managed by the job control print service 605.

In step S2002, the job control print service 605 determines whether the job status notification sent from the device scheduler 900 is a job completion notification or job status change notification. If the job control print service 605 determines that the accepted job status notification is a job status change notification, the job control print service 605 updates the job status of the job information in step S2009.

If the job control print service 605 determines in step S2002 that the accepted job status notification is a job completion notification, the job control print service 605 deletes the job information from the job management queue 1701 in step S2003.

In step S2004, the job control print service 605 confirms whether a job from the client computer that has not undergone printing yet remains in the job management queue 1701. If a job remains, the flow shifts to step S2001 in order to maintain connection to the device scheduler 900 because the job control print service 605 still exchanges data with the device scheduler 900.

If it is confirmed in step S2004 that no job from the client computer remains, the process shifts to step S2005, and the job control print service 605 starts a process of ending connection to the device scheduler 900.

In step S2005, the job control print service 605 requests the device scheduler 900 to cancel registration of a job event or device event which has been registered in the device scheduler 900 at the start of connection. In accordance with this request, the device scheduler 900 deletes the contents of the registered event in client information. If there is no registered event information, the job control print service 605 is not notified of any job status even upon a change in job status managed by the device scheduler 900.

In step S2006, the job control print service 605 issues a disconnection request to the device scheduler 900. Upon reception of the disconnection request, the device scheduler 900 deletes the client information from the client management queue 1001.

In step S2007, the job control print service 605 performs a process of ending the session with the device scheduler 900, and the process waits in step S2001.

By the above process, the first printing can be quickly achieved while the order of print processes is controlled in the network printer.

The first embodiment has described a network printer capable of inserting/removing a network card. However, the present invention is not limited to this, and can also be applied to a network printer having the function of a network card.

Second Embodiment

The second embodiment of the present invention will be described. In the first embodiment, the schedule-up transmission condition is that the turn of print reservation comes. In the second embodiment, a device status at that time is further added to the condition. The remaining arrangement and operation are the same as those in the first embodiment, the same reference numerals denote the same parts, and a description thereof will be omitted.

Figure 21:
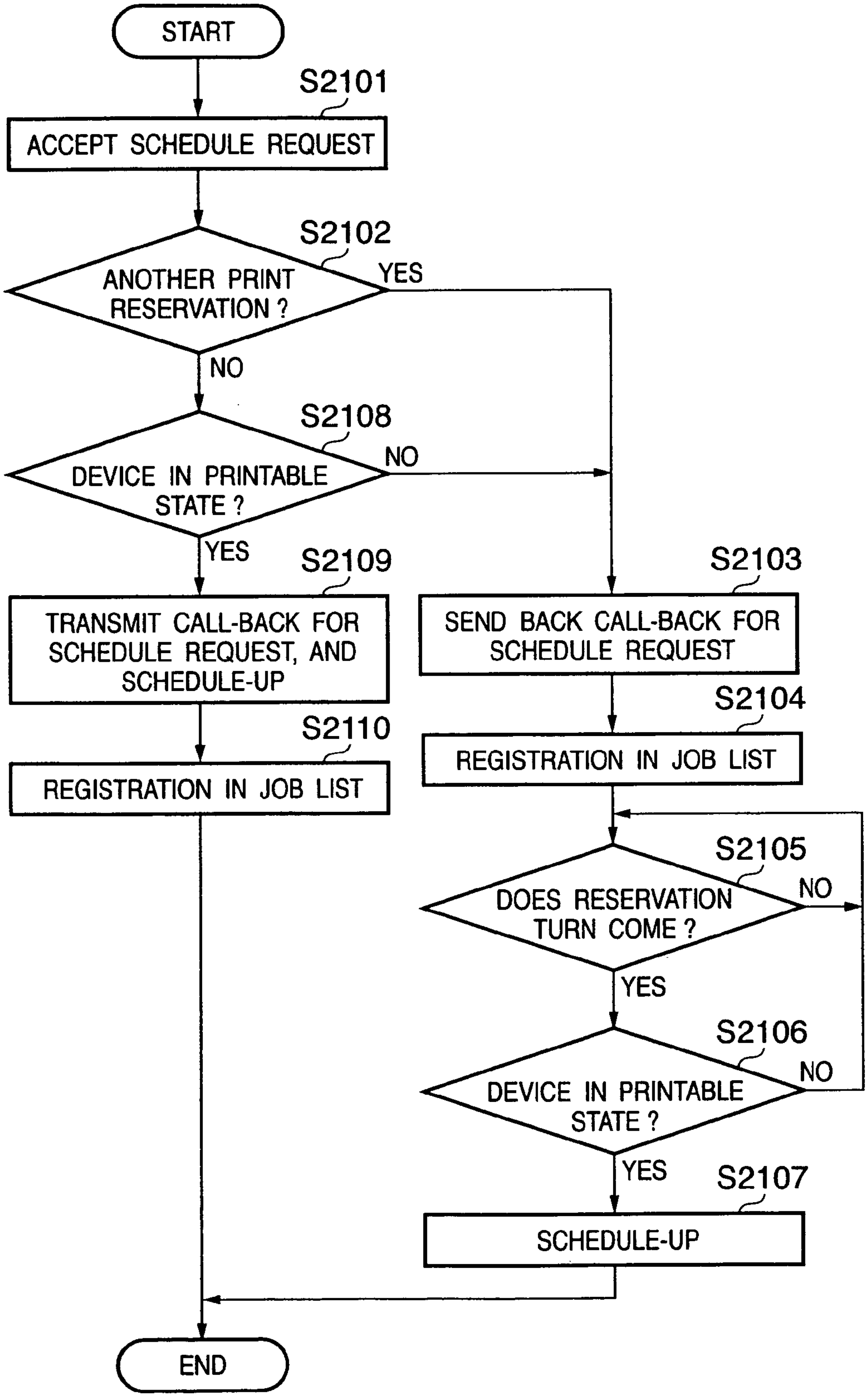
FIG. 21 is a flowchart showing the flow of a process in the schedule management unit of the device scheduler 900 until schedule-up is issued upon acceptance of a schedule request from the job control print service.

FIG. 21 is a flowchart showing the process of a schedule management unit 902 in a device scheduler 900 until schedule-up is issued after a schedule request is accepted from a job control print service 605.

In step S2101, the device scheduler 900 accepts print schedule requests from client computers 101 to 103.

In step S2102, the device scheduler 900 determines whether another managed job exists. If another job exists, the process advances to step S2103; if no job exists, to step S2108.

In step S2103, the schedule management unit 902 transmits call-back for the schedule request accepted in step S2101. In step S2104, the schedule management unit 902 registers job information added to the accepted schedule request in a job management queue 1101.

In step S2105, the schedule management unit 902 confirms whether a job corresponding to the job information registered in the job management queue 1101 in step S104 is subjected to schedule-up. If YES in step S2105, the process advances to step S2106; if NO, to step S2105.

In step S2106, the schedule management unit 902 determines whether a print engine 516 is in a printable state. If the print engine 516 is in a printable state, the schedule management unit 902 issues in step S2107 schedule-up to the client computer which has transmitted the schedule request in step S2101, and the process ends. If the print engine 516 is not in a printable state, the process returns to step S2105.

If the schedule management unit 902 determines in step S2102 that no print job exists, it determines in step S2108 whether the print engine 516 is in a printable state. If the print engine 516 is in a printable state, the schedule management unit 902 also issues schedule-up of the job in step S2109 successively after transmitting call-back for the schedule request. If the print engine 516 is not in a printable state, the process advances to step S2103.

In determining in step S2108 whether the device is in a printable state, for example, status information of the print engine 516 is acquired from a printer controller 519 via an expansion interface 517, and it is determined whether the print engine is in a pintable state.

In step S2110, the schedule management unit 902 registers job information added to the accepted schedule request in the job management queue 1101, and the process ends.

By the above process, when no print reservation exists and the device is in a printable state, schedule-up is done for an accepted print request before registration in the job list, and the first printing can be quickly, reliably achieved. The second embodiment can, therefore, provide a printing apparatus capable of quickly performing the first printing while managing print requests.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-249018 filed on Aug. 27, 2004, which is hereby incorporated by reference herein.

What is claimed is:

1. A printing apparatus comprising:

a receiving unit configured to receive a print request for printing print data from an external device;

a registration unit configured to register a print job in accordance with the print request received by said receiving unit;

a process order control unit configured to control a process order of the print job registered in said registration unit;

a determining unit configured to determine whether there is another print job which has been registered in said registration unit; and a control unit configured to (1) register, in a case where said receiving unit receives the print request and said determining unit determines that there is at least another print job, the print job in said registration unit before requesting the external device to transmit the print data, and request the external device to transmit the print data after registering the print job in said registration unit, and (2) request, in a case where said receiving unit receives the print request and said determining unit determines that there is not another print job , the external device to transmit the print data to the printing apparatus before registering the print job in said registration unit and register the print job in said registration unit after requesting the external device to transmit the print data to the printing apparatus.

2. The apparatus according to claim 1, wherein said determining unit further determines whether the printing apparatus is in a printable state, and in a case where said receiving unit receives the print request and said determining unit determines that there is not other print job and the printing apparatus is in a printable state, said control unit requests the external device to transmit print data before registering the print job in said registration unit.

3. The apparatus according to claim 1, wherein the print job includes print job information about the print job.

4. The apparatus according to claim 3, wherein the print job information indicates at least one of a document name, job identifier, a user name, the number of pages, a job status, and an address of the external device.

5. The apparatus according to claim 1, further comprising a notifying unit configured to notify a user of a status of the print job registered in said registration unit.

6. A network device connectable to a printing apparatus, comprising:

a receiving unit configured to receive a print request for printing print data from an external device;

a registration unit configured to register a print job in accordance with the print request received by said receiving unit;

a process order control unit configured to control a process order of the print job registered in the registration unit;

a determination unit configured to determine whether there is another print job which has been registered in the registration unit; and a control unit configured to (1) register, in a case where said receiving unit receives the print request and said determining unit determines that there is at least another print job, the print job in said registration unit before requesting the external device to transmit the print data, and request the external device to transmit the print data after registering the print job in said registration unit, and (2) to request, in a case where said receiving unit receives the print request and said determining unit determines that there is not another print job the external device to transmit the print data to the printing apparatus before registering the print job in said registration unit and register the print job in said registration unit after requesting the external device to transmit the print data to the printing apparatus.

7. The device according to claim 6, wherein said determining unit further determines whether the printing apparatus is in a printable state, and in a case where the receiving unit receives the print request and said determining unit determines that there is not another print job unit and the printing apparatus is in a printable state, said control unit requests the external device to transmit print data before registering the print job in said registration unit.

8. The apparatus according to claim 6, further comprising a notifying unit configured to notify a user of a status of the print job registered in said registration unit.

9. A printing control method comprising:

a receiving step of receiving a print request for printing print data from an external device;

a registration step of registering, in a registration unit, a print job in accordance with the print request received in the receiving step:

a process order control step of controlling a process order of the print job registered in the registration unit;

a determining step of determining whether there is another print job which is registered in said registration unit; and a control step of (1) registering, in a case where the print request is received in the receiving step and it is determined in said determining step that there is at least another print job, the print job in said registration unit before requesting the external device to transmit the print data and, requesting the external device to transmit the print data after registering the print job in said registration unit, and (2) of requesting, in a case where the print request is received in the receiving step and it is determined in said determining step that there is not another print job, the external device to transmit the print data before registering the print job in said registration unit, the external device to transmit the print data to the printing apparatus before registering the print job in said registration unit and requesting the external device to transmit the print data to the printing apparatus.

10. A printing control program stored on a non transistory recordable storage medium for controlling printing by causing a processor in a printing apparatus to execute the program comprising;

a receiving step of receiving a print request for printing print data from an external device;

a registration step of registering, in a registration unit, a print job in accordance with the print request received in the receiving step, a determining step of determining whether there is another print request which is registered in said registration unit; and a control step of (1) registering, in a case where the print request is received in the receiving step and it is determined in said determining step that there is at least another print job, the print job in said registration unit after requesting the external device to transmit the print data, and requesting the external device to transmit the print data after registering the print job in said registration unit, and (2) of requesting, in a case where the print request is received in the receiving step and it is determined in said determining step that there is not another print job, the external device to transmit the print data to the printing apparatus before registering the print job in said registration unit and registering the print job in said registration unit after requesting the external device to transmit the print data to the printing apparatus.

* * * * *